(12) United States Patent
Kishi

(10) Patent No.: US 10,963,536 B2
(45) Date of Patent: Mar. 30, 2021

(54) INFORMATION PROCESSING SYSTEM AND INFORMATION PROCESSING METHOD

(71) Applicant: Hidenobu Kishi, Kanagawa (JP)

(72) Inventor: Hidenobu Kishi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 260 days.

(21) Appl. No.: 15/921,719

(22) Filed: Mar. 15, 2018

(65) Prior Publication Data
US 2018/0276225 A1   Sep. 27, 2018

(30) Foreign Application Priority Data

Mar. 21, 2017   (JP) .............................. JP2017-055203

(51) Int. Cl.
| | | |
|---|---|---|
| *G06F 16/958* | (2019.01) | |
| *G06Q 30/02* | (2012.01) | |
| *G06F 16/58* | (2019.01) | |
| *G06F 16/9535* | (2019.01) | |
| *G06F 16/2457* | (2019.01) | |

(52) U.S. Cl.
CPC ........ *G06F 16/958* (2019.01); *G06F 16/2457* (2019.01); *G06F 16/5866* (2019.01); *G06F 16/9535* (2019.01); *G06Q 30/0203* (2013.01)

(58) Field of Classification Search
CPC .......... G06F 8/20; G06F 9/465; G06F 16/258; G06F 16/27
USPC .......................................... 707/769; 717/214
See application file for complete search history.

(56) References Cited

U.S. PATENT DOCUMENTS

| | | | |
|---|---|---|---|
| 8,156,115 B1 | 4/2012 | Erol et al. | |
| 10,454,926 B2* | 10/2019 | Bruno | ................. H04L 63/0861 |
| 2009/0019402 A1 | 1/2009 | Ke et al. | |
| 2009/0070415 A1 | 3/2009 | Kishi et al. | |
| 2011/0035662 A1* | 2/2011 | King | ..................... G06F 40/169 |
| | | | 715/273 |
| 2012/0059910 A1* | 3/2012 | Cassidy | ................. G06Q 30/00 |
| | | | 709/219 |

(Continued)

FOREIGN PATENT DOCUMENTS

| | | |
|---|---|---|
| JP | 2015-038717 | 2/2015 |
| JP | 2016-095790 | 5/2016 |

*Primary Examiner* — Hung T Vy
(74) *Attorney, Agent, or Firm* — Oblon, McClelland, Maier & Neustadt, L.L.P.

(57) ABSTRACT

An information processing system is configured to distribute account information for permitting setting for a service of a service providing system, to a content providing system, distribute, to the content providing system, a search module for causing the terminal device to perform a process of transmitting a search request to request a search for link information based on an environment of the terminal device, to a user environment identification device in association with identification information of the terminal device, transmit, to the terminal device, the link information that is retrieved from a databased based on the environment included in the search request that is transmitted from the terminal device in association with the identification information by the terminal device executing the search module, access the service providing system in accordance with the account information, perform setting for the service, and acquire the link information corresponding to the setting.

12 Claims, 24 Drawing Sheets

(56) References Cited

U.S. PATENT DOCUMENTS

| | | |
|---|---|---|
| 2013/0152047 A1 * | 6/2013 | Moorthi .............. G06F 11/3688 717/124 |
| 2014/0006387 A1 | 1/2014 | Kishi et al. |
| 2014/0006435 A1 | 1/2014 | Kishi et al. |
| 2016/0140704 A1 | 5/2016 | Itoh et al. |
| 2016/0154827 A1 | 6/2016 | Kishi |
| 2016/0321303 A1 | 11/2016 | Kishi et al. |
| 2016/0364415 A1 | 12/2016 | Itoh et al. |
| 2017/0052980 A1 | 2/2017 | Itoh et al. |
| 2017/0206224 A1 | 7/2017 | Itoh et al. |
| 2017/0235968 A1 | 8/2017 | Kishi |

* cited by examiner

FIG.2

XX QUESTIONNAIRE

GENDER: ● MALE  ○ FEMALE

AGE: ● -20  ○ 21-30  ○ 31-40  ○ 41-50  ○ 51-

Q1. ARE YOUR XXX?  ● Y  ○ N

Q2. CHECK ITEMS YOU ARE INTERESTED IN (MULTIPLE CHOICE ALLOWED)

☑ MUSIC  ☐ PAINTING  ☑ SPORTS  ☐ IT  ☐ QUALIFICATION

☐ MOVIE  ☐ DRAMA  ☑ COMIC  ☐ NOVEL  ☐ CRITICISM

[OK]

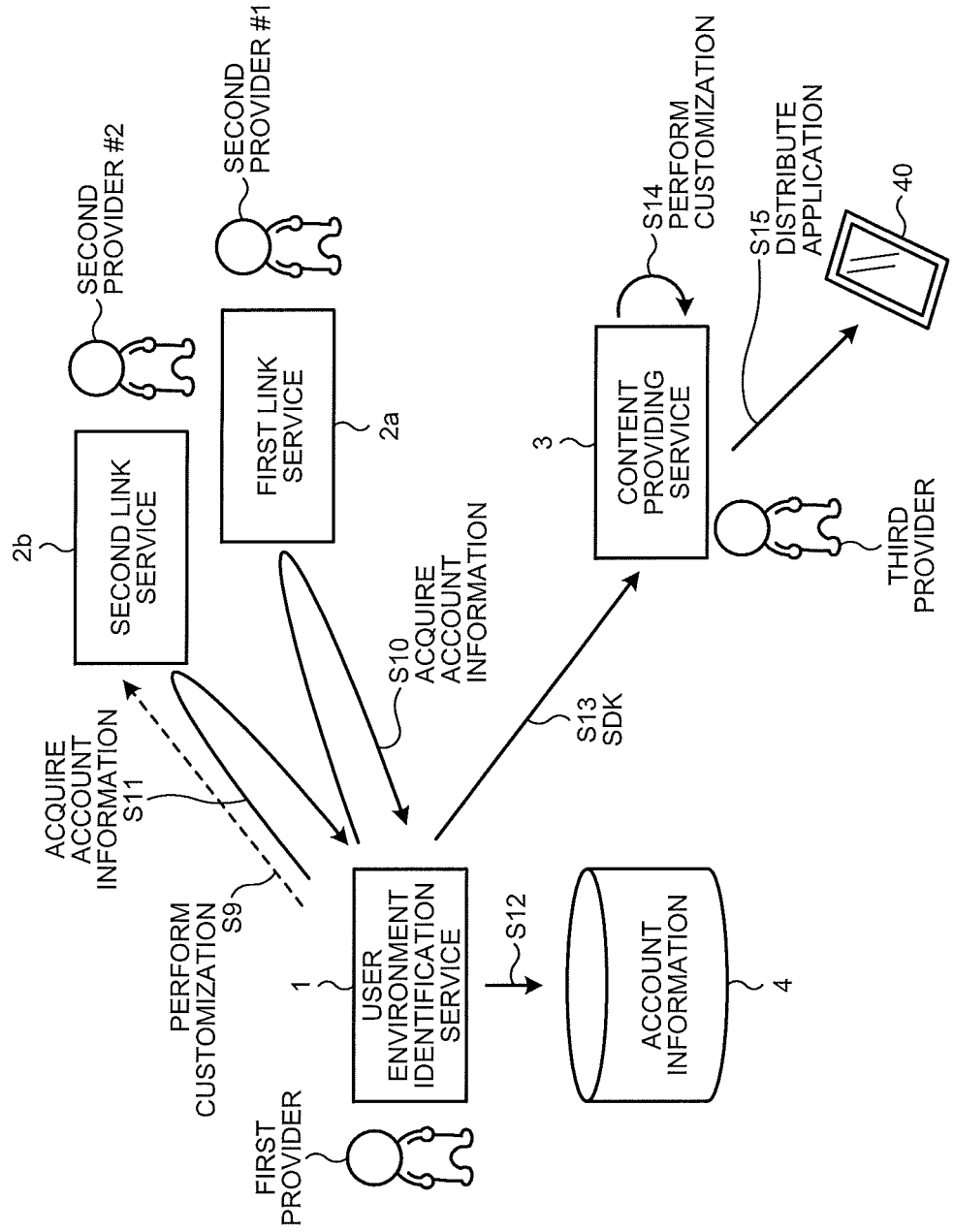

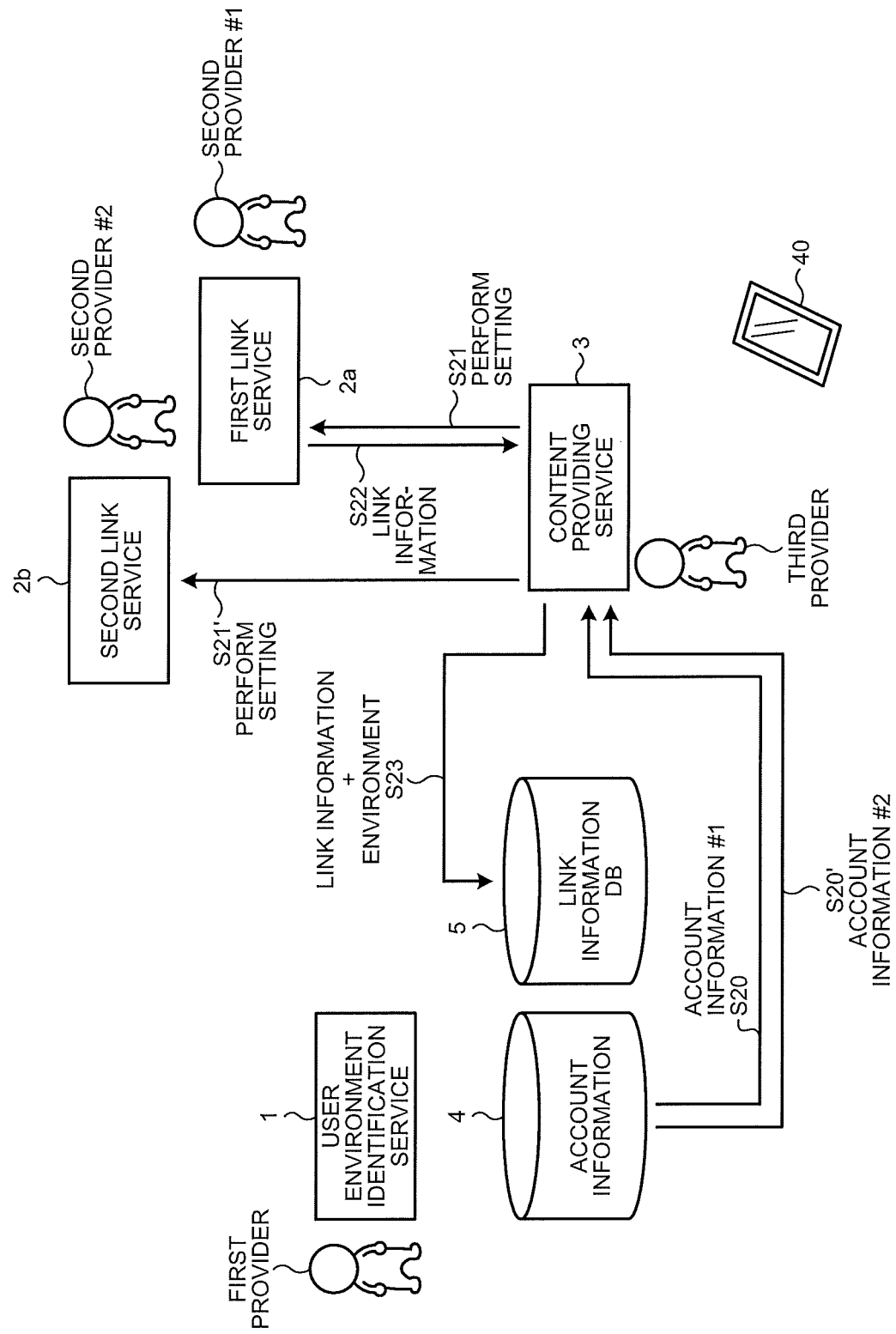

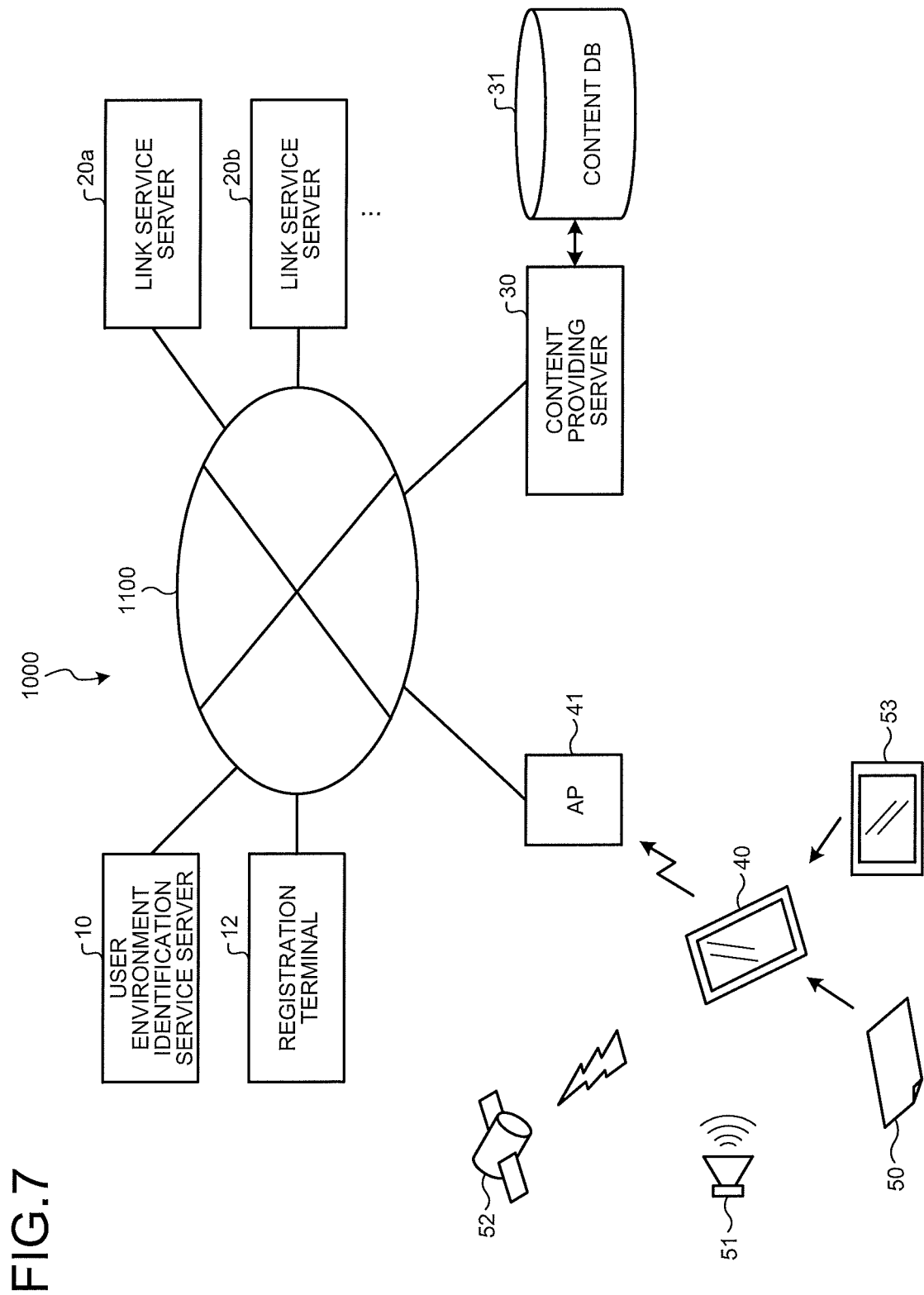

FIG.20B

| STAMP BEHAVIOR SETTING | | | | |
|---|---|---|---|---|
| STAMP LAYOUT | | ○ 4 STAMPS (2×2)  ● 9 STAMPS (3×3)  ○ 16 STAMPS (4×4) | | |
| STAMP IMAGE SIZE | | 100%  [────────●] | | |
| DISPLAY BUTTON | NUMBER OF ACQUIRED STAMPS | 0  *IN CASE OF "0", NUMBER OF STAMPS IS APPLIED | | |
| | TEXT | TO SPECIAL CONTENTS! | | |
| | LINK URL | http://3.example.com/special/ABC777?id=[uid] | | |
| | | BRIEF SETTING | | |
| | | *IN BRIEF SETTING, USE OF IMAGE DISPLAY, MOVING IMAGE REPLAY FUNCTION, MAILER ACTIVATION FUNCTION AVAILABLE FOR COUPON, ETC. CAN BE SET | | |
| SET  PREVIEW | | | | |

| STAMP IMAGE SETTING | | | | |
|---|---|---|---|---|
| *STAMP IMAGE SIZE CORRESPONDS TO SQUARE OF ABOUT 320px×320px  *IMAGE FOR WHICH USE IS CANCELLED IS NOT HANDLED AS STAMP  (ACTUAL NUMBER OF STAMPS IS REDUCED) | | | | |
| # | CODE | ON IMAGE | OFF IMAGE | |
| 1 | 0161 | [img] ⊕ SELECT FILE / NOT SELECTED | ☐ ⊕ SELECT FILE / NOT SELECTED | CANCEL USE |
| 2 | 0217 | [img] ⊕ SELECT FILE / NOT SELECTED | ☐ ⊕ SELECT FILE / NOT SELECTED | CANCEL USE |
| 3 | 03cf | [img] ⊕ SELECT FILE / NOT SELECTED | ☐ ⊕ SELECT FILE / NOT SELECTED | CANCEL USE |
| 4 | 0486 | [img] ⊕ SELECT FILE / NOT SELECTED | ☐ ⊕ SELECT FILE / NOT SELECTED | CANCEL USE |
| SET  PREVIEW | | | | |

| INITIALIZATION |
|---|
| INITIALIZE SETTING |

INFORMATION PROCESSING SYSTEM AND INFORMATION PROCESSING METHOD

CROSS-REFERENCE TO RELATED APPLICATIONS

The present application claims priority under 35 U.S.C. § 119 to Japanese Patent Application No. 2017-055203, filed on Mar. 21, 2017. The contents of which are incorporated herein by reference in their entirety.

BACKGROUND OF THE INVENTION

1. Field of the Invention

The present invention relates to an information processing system and an information processing method.

2. Description of the Related Art

There is a known image search system that stores link information and image information in advance in association with each other, retrieves the stored image information in response to a search request that is based on a captured image obtained through imaging using a camera or the like, and transmits the link information associated with the retrieved image information to a source of the search request, for example. The link information includes, for example, information indicating a link destination, and, the source of the search request can access the link destination based on the link information and acquire contents or the like from the link destination.

Japanese Unexamined Patent Application Publication No. 2016-095790 describes a technology that allows, for example, a provider of the link destination of the link information to easily perform a registration process of registering the link information and the image information in the image search system in association with each other.

However, conventionally, it is difficult for a content provider to link a search result that is obtained by the image search system as described above and a content providing service that is provided by the provider with a system other than the image search system and a system of the provider.

SUMMARY OF THE INVENTION

According to an aspect of the present invention, an information processing system includes a user environment identification device, a database, and first to third circuitry. The user environment identification device is configured to identify an environment of a terminal device used by a user. The environment and link information for making a link with a service provided by a service providing system are registered in association with each other in the database. The first circuitry is configured to: distribute account information for permitting setting for the service of the service providing system, to a content providing system configured to provide a content in linkage with the service providing system in accordance with the link information, distribute, to the content providing system, a search module for causing the terminal device to perform a process of transmitting a search request to request a search for the link information based on the environment of the terminal device identified by identification information, to the user environment identification device in association with the identification information, and transmit, to the terminal device identified by the identification information associated with the search request, the link information that is retrieved from the databased based on the environment included in the search request that is transmitted from the terminal device in association with the identification information for identifying the terminal device as a result of the terminal device executing the search module. The second circuitry is configured to access the service providing system in accordance with the account information, perform setting for the service of the service providing system, and acquire the link information corresponding to the setting from the service providing system. The third circuitry is configured to register, in the database, the environment and the link information that is acquired by the setting unit from the service providing system, in association with each other.

BRIEF DESCRIPTION OF THE DRAWINGS

FIG. 2 is a diagram illustrating an example of a questionnaire input screen that is provided on a user terminal by a questionnaire collection service applicable to the embodiment;

FIG. 5 is a diagram for explaining links between services in the information processing system according to the embodiment;

FIG. 6 is a diagram for explaining links between services in the information processing system according to the embodiment;

FIG. 7 is a block diagram illustrating an example of a system configuration according to the embodiment;

FIG. 20B is a diagram for explaining an example of the stamp rally management screen applicable to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
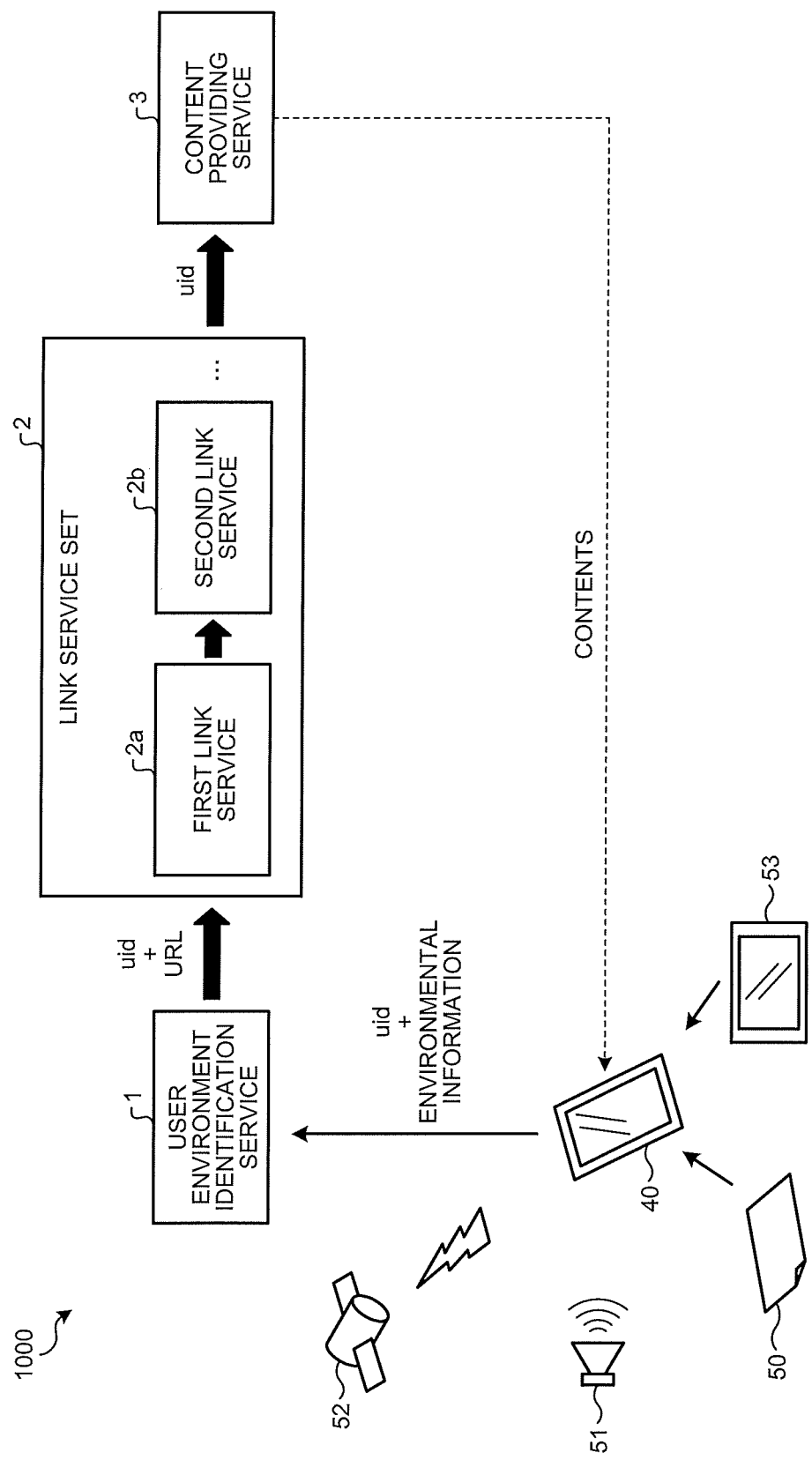
FIG. 1 is a diagram for schematically explaining an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to flexibly set a link between different systems.

Exemplary embodiments of an information processing system and an information processing method will be described in detail below with reference to the accompanying drawings.

Overview of Information Processing System According to Embodiment

FIG. 1 is a diagram for schematically explaining an information processing system according to an embodiment. In FIG. 1, an information processing system 1000 according to the embodiment includes a user environment identification service 1, one or more link services (a first link service 2a, a second link service 2b, . . . in the example in FIG. 1), and a content providing service 3, each of which is provided by a server device or the like connected to a network.

Hereinafter, it is assumed that each of the user environment identification service 1, the first link service 2a, the second link service 2b, and the content providing service 3 are equivalent to a server device for providing each of the services unless otherwise specified. In addition, it is assumed that a service of the second link service 2b is additionally executed depending on a result of the first link service 2a, for the sake of explanation.

The user environment identification service 1 includes a database in which environmental information and link information are registered in association with each other. The user environment identification service 1 receives environmental information and identification information uid for identifying a user terminal 40 that is a terminal device used by a user, where each of the information is transmitted from the user terminal 40. The user environment identification service 1 searches through the database based on the received environmental information, acquires link information associated with the environmental information, and returns the acquired link information to the user terminal 40. The link information is, for example, a uniform resource locator (URL) that indicates a link destination.

An environment indicated by the environmental information is, for example, an image 50, a sound 51, and an electronic advertisement 53 that are present around the user terminal 40, or location information 52 that is acquired by a global navigation satellite system (GNSS) and that indicates a location of the user terminal 40. The image 50 may be acquired by imaging a printed medium or by imaging surrounding scenery. The user terminal 40 transmits, as the environmental information indicating an environment of the user terminal 40, the image 50 obtained by imaging a predetermined object, an image acquired from the electronic advertisement 53, the sound 51 output from a predetermined sound source, and the location information 52 acquired by the GNSS to the user environment identification service 1 in association with the identification information uid.

The user terminal 40 is an information processing apparatus used by what is called an end user who uses each of the user environment identification service 1, a link service set 2, and the content providing service 3. The user terminal 40 is an information processing apparatus configured in an easily portable manner, and may be a tablet computer or a multifunctional mobile-phone terminal (smartphone), for example. The user terminal 40 has at least one of an imaging function, a sound collection function, and a location information acquisition function. For example, the end user uses the user terminal 40 in order to eventually acquire contents from the content providing service 3.

The user terminal 40 accesses the first link service 2a in accordance with the link information acquired from the user environment identification service 1, sends the identification information uid to the first link service 2a, and executes a service of the first link service 2a. The first link service 2a stores a log based on the identification information uid in accordance with execution of the service by the user terminal 40. The user terminal 40 further accesses the second link service 2b in accordance with link information that is provided as a result of the service of the first link service 2a, sends the identification information uid to the second link service 2b, and executes a service of the second link service 2b. The second link service 2b stores a log based on the identification information uid in accordance with execution of the service by the user terminal 40.

In this manner, the first link service 2a and the second link service 2b store logs based on the identification information uid that is capable of identifying the user terminal 40, in accordance with execution of the services by the user terminal 40. Therefore, it is possible to manage services for each of the user terminals 40.

The user terminal 40 eventually accesses the content providing service 3 in accordance with a result of the service of the second link service 2b, and sends the identification information uid to the content providing service 3. The content providing service 3 provides contents to the user terminal 40 based on the identification information uid received from the user terminal 40. The content providing service 3 stores, as a log, the identification information uid indicating the user terminal 40 to which the contents are provided.

In FIG. 1, a process is transferred from the first link service 2a to the second link service 2b, and further transferred from the second link service 2b to the content providing service 3 for the sake of explanation. However, in reality, an execution result of each of the services and the identification information uid are returned to the user terminal 40, and the user terminal 40 requests a next service using the execution result and the identification information uid, for example.

With reference to FIG. 2 to FIG. 4B, examples of services provided by the first link service 2a and the second link service 2b will be described. Hereinafter, the first link service 2a and the second link service 2b will be collectively referred to as a "link service" when they need not be distinguished from each other.

While various kinds of services may be provided as the link service, three kinds of services, that is, (1) a questionnaire collection service, (2) a slot game service, and (3) a stamp rally service, will be described as examples of the services.

FIG. 2 illustrates an example of a questionnaire input screen that is provided on the user terminal 40 by (1) the questionnaire collection service applicable to the embodiment. In FIG. 2, a questionnaire input screen 500 includes a reply input region 501 and a button 502. The reply input region 501 is a region for giving replies to questionnaire entries through operation on radio buttons and check boxes. In response to operation on the button 502, the user terminal 40 transmits information on replies, which are input in the reply input region 501, to the questionnaire collection service in association with the identification information uid.

Figure 3A:
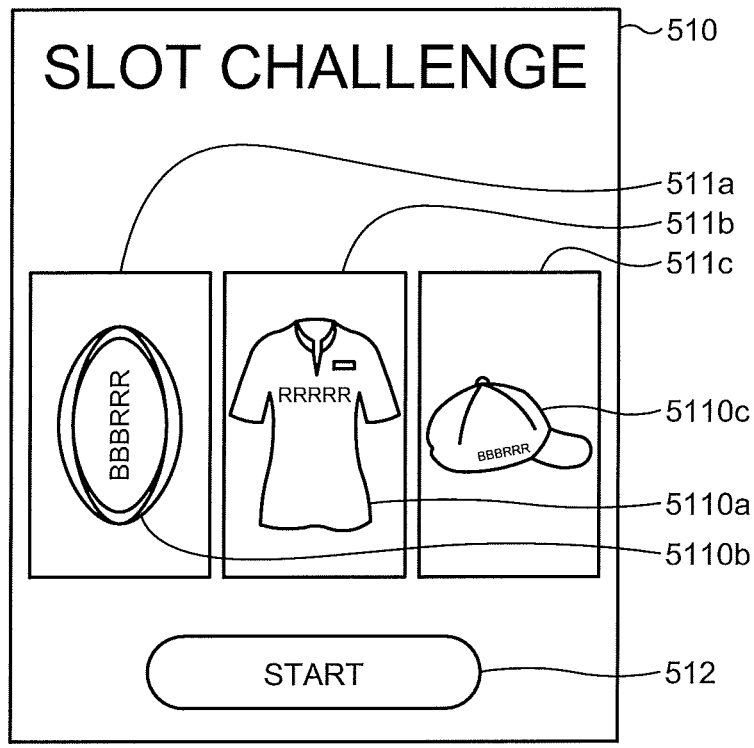
FIGS. 3A and 3B are diagrams illustrating an example of a slot screen that is provided on the user terminal by a slot game service applicable to the embodiment.
Figure 3B:
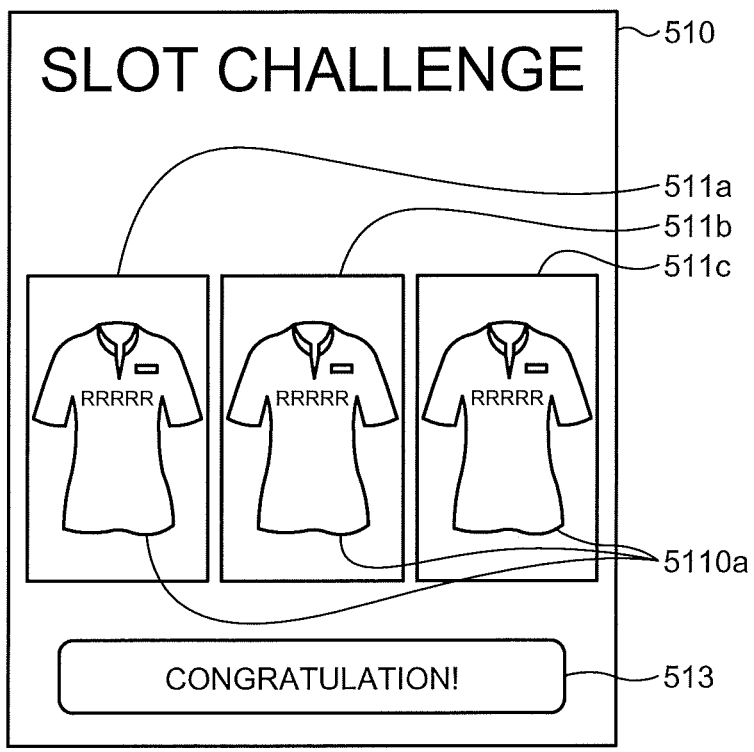

FIGS. 3A and 3B illustrate an example of a slot screen that is provided on the user terminal 40 by (2) the slot game service applicable to the embodiment. In FIG. 3A, a slot screen 510 includes three slot portions 511a, 511b, and 511c and a button 512. In the example in FIG. 3A, slot images 5110a, 5110b, and 5110c are displayed in the slot portions 511a, 511b, and 511c. The button 512 is a button for starting a slot game using the slot screen 510.

When the button 512 is operated, each of the slot portions 511a, 511b, and 511c are virtually rotated, and a slot image displayed in each of the slot portions 511a, 511b, and 511c is changed with rotation. In this example, it is assumed that the slot images 5110a, 5110b, and 5110c are cyclically changed from one to the other in each of the slot portions 511a, 511b, and 511c.

Rotation of each of the slot portions 511a, 511b, and 511c is stopped after a lapse of a predetermined time from the start of operation on the button 512, and any of the slot images 5110a, 5110b, and 5110c is displayed in each of the slot portions 511a, 511b, and 511c. If the same slot image is displayed in each of the slot portions 511a, 511b, and 511c, that is, if the slot image is hit, a user wins the slot game.

FIG. 3B illustrates an example in which the same slot image 5110a is displayed in each of the slot portions 511a, 511b, and 511c, that is, the slot image 5110a is hit. In this case, in the slot screen 510, a button 513 is displayed instead of the button 512 illustrated in FIG. 3A, where the button 513 displays a message indicating that a user wins the game. In response to operation on the button 513, the user terminal 40 transmits, from the user terminal 40 to a link service that provides the slot game service, information indicating the slot image (the slot image 5110a in this example) that is displayed in common in all of the slot portions 511a, 511b, and 511c, in association with the identification information uid.

Figure 4A:
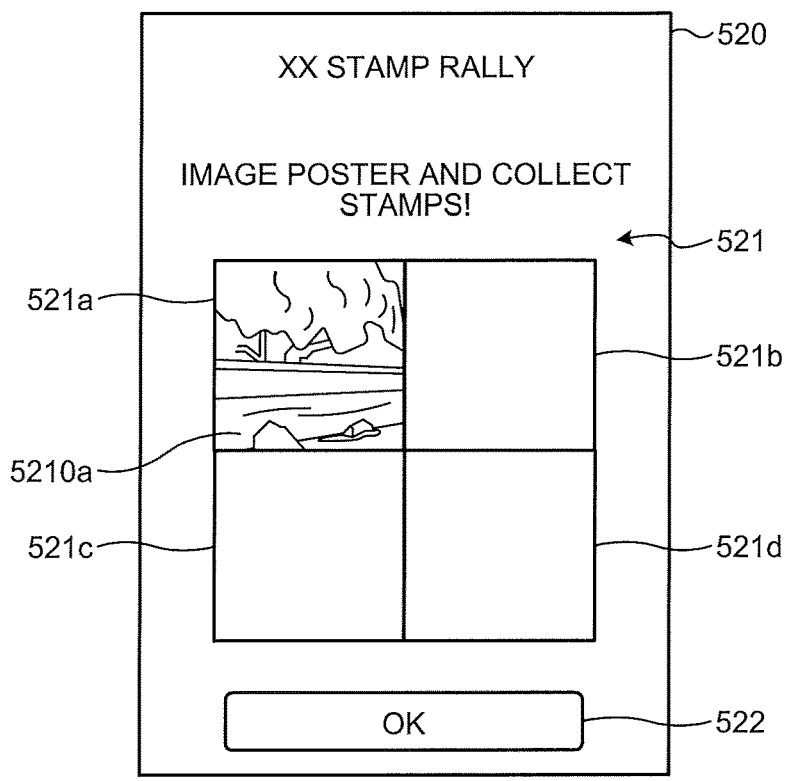
FIGS. 4A and 4B are diagrams illustrating an example of a stamp rally screen that is provided on the user terminal by a stamp rally service applicable to the embodiment.
Figure 4B:
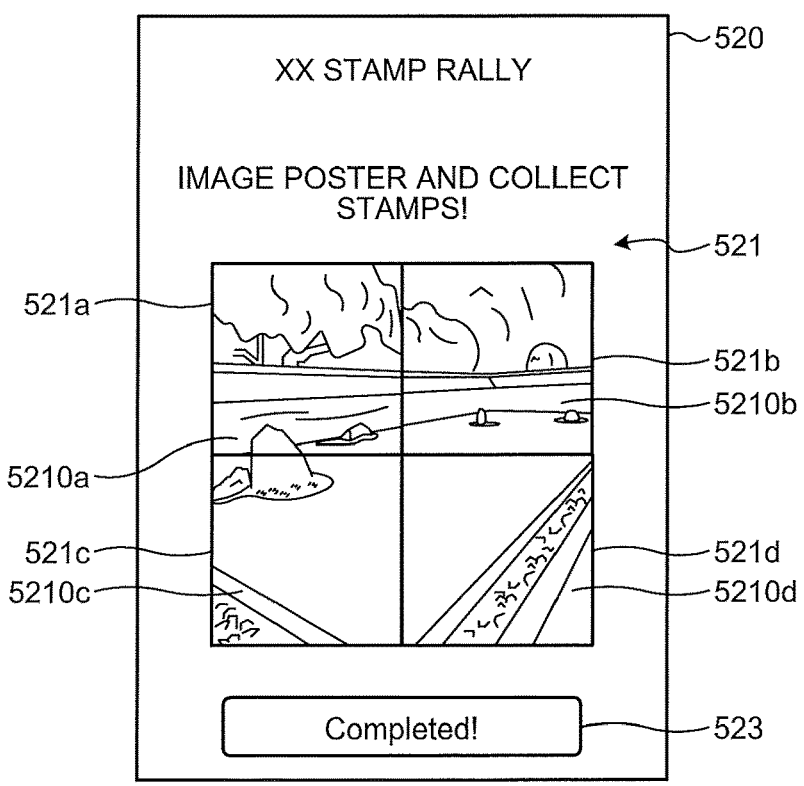

FIGS. 4A and 4B illustrate an example of a stamp rally screen that is provided on the user terminal 40 by (3) the stamp rally service applicable to the embodiment. In FIG. 4A, a stamp rally screen 520 includes a stamp image display region 521 and a button 522. The stamp image display region 521 is divided into a plurality of regions 521a, 521b, 521c, and 521d. For example, when the user terminal 40 performs imaging in accordance with a predetermined condition, a stamp image (for example, a stamp image 5210a) corresponding to a captured image obtained by the imaging is displayed in a predetermined region (for example, the region 521a) among the regions 521a, 521b, 521c, and 521d.

For example, upon acquiring an image corresponding to the region 521a by imaging, the user terminal 40 transmits the image and the own identification information uid in association with each other to the user environment identification service 1. The user environment identification service 1 searches through the database, acquires link information associated with the image, and transmits the acquired link information to the user terminal 40 in association with the identification information uid. The link information is an URL of a link service that provides the stamp rally service. The URL includes a parameter indicating the region 521a.

The user terminal 40 adds the own identification information uid to the link information, and accesses the first link service 2a. In response to the access, the link service provides, on the user terminal 40, the stamp rally screen 520 in which the predetermined image 5210a is displayed in the region 521a of the stamp image display region 521. FIG. 4A illustrates an example in which the stamp image 5210a is displayed in the region 521a as described above.

When the user terminal 40 transmits all of images specified by the stamp rally service to the first link service 2a, the link service provides, on the user terminal 40, the stamp rally screen 520 as illustrated in FIG. 4B, in which all of the stamp image 5210a and stamp images 5210b, 5210c, and 5210d specified by the stamp rally service are displayed in the regions 521a, 521b, 521c, and 521d, respectively. In the example in FIG. 4B, a button 523 is displayed instead of the button 522 illustrated in FIG. 4A, where the button 523 indicates that a condition for the stamp rally is achieved.

In response to operation on the button 523, the user terminal 40 transmits, from the user terminal 40 to a link service that provides the stamp rally service, a stamp rally condition achievement notice indicating that the condition for the stamp rally is achieved, in association with the identification information uid.

As illustrated in FIG. 1, it is possible to provide a plurality of services of the first link service 2a, the second link service 2b, . . . in combination with one another in the information processing system 1000 according to the embodiment. As one example, in the example as described above, it may be possible to provide the questionnaire collection service and thereafter provide the slot game service depending on a result of the questionnaire collection service.

For example, it may be possible to provide the slot game service to only the user terminal 40 that has transmitted replies to the questionnaire collection service. More specifically, it is assumed that the first link service 2a provides the questionnaire collection service and the second link service 2b provides the slot game service. In this case, the URL of the second link service 2b is included in the link information that is transmitted from the first link service 2a in response to transmission of replies to the questionnaire. The user terminal 40 can receive the slot game service provided by the second link service 2b in accordance with the link information.

Links between Services in Information Processing System According to Embodiment

Next, with reference to FIG. 5 and FIG. 6, links between services in the information processing system 1000 according to the embodiment will be described. In FIG. 5 and FIG. 6, the same components as those illustrated in FIG. 1 will be denoted by the same reference signs, and detailed explanation thereof will be omitted.

As illustrated in FIG. 5, the user environment identification service 1 is provided by a first provider, the first link service 2a is provided by a second provider #1, and the second link service 2b is provided by a second provider #2. Further, the content providing service 3 is provided by a third provider. Each of the first provider, the second provider #1, the second provider #2, and the third provider indicates not only a specific individual but also an organization, such as a company, an autonomous community, or a legal entity.

In FIG. 5, the first provider acquires, from the first link service 2a, account information for permitting setting for a service provided by the first link service 2a (Step S10). At this time, it is possible to acquire a plurality of pieces of account information for a single service. Similarly, the first provider can acquire account information for permitting setting for a service provided by the second link service 2b after signing a predetermined contract with the second provider #2 if needed (Step S11). The first provider stores the account information acquired from each of the first link service 2a and the second link service 2b in an account information storage unit 4 (Step S12).

In some cases, the first link service 2a or the second link service 2b may be incompatible with a process using the identification information uid. In this case, it is necessary to customize the first link service 2a or the second link service 2b, which is incompatible with the identification information uid, such that the service becomes compatible with the identification information uid. For example, as indicated at Step S9 in FIG. 5, when the second link service 2b is incompatible with the identification information uid, the first provider signs a predetermined contract with the second provider #2 and then requests the second provider #2 to customize functions of the second link service 2b before the account acquisition process at Step S11. The request for customization at Step S9 will be described later.

The third provider sings a contract with the first provider for permission to use the user environment identification service 1. The first provider provides, to the third provider, a software development kit (SDK) for configuring an application program (hereinafter, simply referred to as an application), which is adopted to use the user environment identification service 1 from the user terminal 40, in accordance with the contract (Step S13). The third provider customizes, by using the SDK, an application that is prepared by the third provider for installation in the user terminal 40 for example (hereinafter, the application will be described as a user application) (Step S14).

With this customization, it becomes possible to generate or acquire identification information with which the user application is identified by the user environment identification service 1, and the user application is enabled to transmit environmental information to the user environment identification service 1. The identification information for identifying the user application is uniquely assigned to each of user applications by the user environment identification service 1 at the time of activating the user application for example, and is used as the identification information uid as described above.

The application that is customized using the SDK provided by the first provider includes a module ID, which is added by the SDK and used to identify a module for executing transmission of the environmental information to the user environment identification service 1, in addition to the identification information (the identification information uid) as described above. The module ID is included, in advance, in the SDK provided by the first provider, for example. The application may further include a contract ID for identifying contents of a contract signed between a third contractor and a first contractor.

The third provider distributes the user application customized as described above to the user terminal 40 (Step S15). In the user terminal 40, the distributed user application is installed, and transmission of the environmental information to the user environment identification service 1 and acquisition of link information corresponding to the transmitted environmental information are enabled.

In FIG. 6, the third provider sings a predetermined contract with the first provider, and the first provider acquires account information #1, which is stored in the account information storage unit 4 and which is for permitting setting for the first link service 2a (Step S20). Further, the third provider can acquire account information #2, which is stored in the account information storage unit 4 and which is for permitting setting for the second link service 2b, in accordance with the contract (Step S20').

In this example, it is assumed that the third provider first executes the service of the first link service 2a, and thereafter executes the service of the second link service 2b in accordance with a result of execution of the service of the first link service 2a. The third provider accesses the first link service 2a using the account information #1 for example (Step S21), and performs setting for the first link service 2a. The first link service 2a provides link information (for example, a URL) on the set service to the third provider in accordance with the contents of the setting (Step S22).

The user environment identification service 1 includes a link information database (DB) 5 for storing the environmental information and the link information in association with each other. The user environment identification service 1 searches through the link information DB 5 based on the environmental information transmitted from the user terminal 40, acquires link information associated with the environmental information, and returns the link information to the user terminal 40. The third provider registers the link information provided by the first link service 2a in the link information DB 5 in association with the environmental information, in accordance with the contract signed with the first provider (Step S23).

The environmental information that is associated with the link information by the third provider is used as a condition for providing the link information to the user terminal 40. For example, it is possible to register, as the environmental information, the image 50 of a specific printed medium (a leaflet or the like) in the link information DB 5 in association with the link information. Further, it is possible to register, as the environmental information, the location information 52 in the link information DB 5 in association with the link information.

Furthermore, it is possible to register, as the environmental information, information indicating the sound 51 with a specific waveform in the link information DB 5 in association with the link information. In this case, the user terminal 40 can transmit the environmental information to the user environment identification service 1 when the user terminal 40 is located in a place where the user terminal 40 can acquire the sound 51. As for the sound 51, it is preferable to select a sound that can hardly be recognized by a human but can be collected by an acoustic device, such as a microphone. As one example, it is possible to use what is called a mosquito sound having a frequency of about 17 kilohertz (kHz) as the sound 51. This sound 51 can express predetermined information by applying an intermittent pattern like a Morse code, for example. It is of course possible to use, as the sound 51, a sound having a frequency lower than 17 kHz or a sound that expresses information using modulation with a sound having a different frequency, instead of using an intermittent pattern. The sound 51 can be managed in association with a sound ID for identifying a sound.

The third provider further accesses the second link service 2b using the account information #2 for example (Step S21'), and performs setting for the second link service 2b. In this example, the user terminal 40 receives the service of the second link service 2b in accordance with the link information that is acquired from the service of the first link service 2a. Therefore, the third provider need not acquire, from the second link service 2b, link information that is to be registered in the link information DB 5.

As described above with reference to FIG. 5 and FIG. 6, the third provider distributes a customized user application to the user terminal 40, performs setting for the first link service 2a and the second link service 2b, and registers the link information and the environmental information in the link information DB 5, so that a series of processes as described above with reference to FIG. 1 is enabled. Consequently, it becomes possible to flexibly set links between different systems.

Example of Configuration according to Embodiment

Next, an example of a configuration according to the embodiment will be described. FIG. 7 illustrates an example of a system configuration according to the embodiment. In FIG. 7, the same components as those illustrated in FIG. 1 are denoted by the same reference signs, and detailed explanation thereof will be omitted.

The information processing system 1000 according to the embodiment includes a user environment identification service server 10, a registration terminal 12, link service servers 20a, 20b, . . . , and a content providing server 30, all of which are communicably connected to one another via a network 1100, such as the Internet, for example.

The user environment identification service server 10 is a server for providing the user environment identification service 1 as illustrated in FIG. 1, and is operated by the first provider. The user environment identification service server 10 includes the account information storage unit 4 and the link information DB 5. The link service servers 20a, 20b, . . . are servers for providing link services. For example, the link service servers 20a and 20b provide the first link service 2a and the second link service 2b as illustrated in FIG. 1, respectively. In this example, it is assumed that the link service server 20a is operated by the second provider #1 and provides the first link service 2a, and the link service server 20b is operated by the second provider #2 and provides the second link service 2b.

The content providing server 30 is a server for providing the content providing service as illustrated in FIG. 1, and includes a content DB 31 for storing contents. Types of the contents provided by the content providing service are not specifically limited. For example, the contents may be a specific still image, a moving image, a ticket purchase option for a concert etc., a coupon code, or the like.

The registration terminal 12 is a terminal device for registering the link information and the environmental information in the user environment identification service server 10. A general personal computer may be adopted as the registration terminal 12. The user environment identification service server 10 provides a registration screen for registering the link information and the environmental information on the registration terminal 12. A browser application (hereinafter, referred to as a "browser") is installed in the registration terminal 12 for example, and the registration screen is what is called a web application and displayed on a screen of the registration terminal 12 with use of the browser. The third provider performs an input process, an editing process, or the like in accordance with the registration screen on the registration terminal 12, and registers the link information and the environmental information in the user environment identification service server 10.

Further, the registration terminal 12 can perform setting for the link services provided by the link service servers 20a, 20b, . . . . For example, the link service server 20a provides a setting screen for performing setting for the first link service 2a on the registration terminal 12. The registration terminal 12 displays the setting screen using the installed browser. The third provider inputs settings for the link service in accordance with the setting screen on the registration terminal 12, and transmits each of input setting values or the like to the link service server 20a.

In FIG. 7, an access point (AP) 41 connected to the network 1100 relays communication between wireless communication using a wireless local area network (LAN) and communication using the network 1100, for example. By establishing communication with the AP 41, the user terminal 40 is enabled to access the user environment identification service server 10, each of the link service servers 20a, 20b, . . . , and the content providing server 30.

Figure 8:
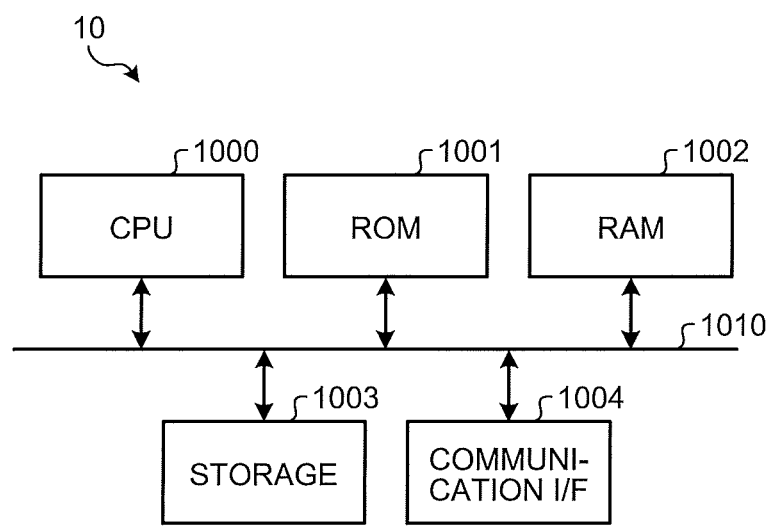
FIG. 8 is a block diagram illustrating an example of a hardware configuration of a user environment identification service server applicable to the embodiment.

FIG. 8 illustrates an example of a hardware configuration of the user environment identification service server 10 applicable to the embodiment. In FIG. 8, the user environment identification service server 10 includes a central processing unit (CPU) 1000, a read only memory (ROM) 1001, a random access memory (RAM) 1002, a storage 1003, and a communication interface (I/F) 1004, all of which are communicably connected to one another via a bus 1010.

The storage 1003 is a storage medium capable of storing data in a non-volatile manner, and is, for example, a hard disk drive, but is not limited thereto. For example, it may be possible to adopt a non-volatile semiconductor memory, such as a flash memory, as the storage 1003. The storage 1003 stores therein a program executed by the CPU 1000 and various kinds of data. The account information storage unit 4 and the link information DB 5 as described above are configured using a storage area of the storage 1003. In FIG. 8, the storage 1003 is configured by single hardware, but is not limited thereto. For example, it may be possible to integrally manage a plurality of storage devices as the single storage 1003.

The CPU 1000 controls the entire user environment identification service server 10 in accordance with a program stored in the ROM 1001 and the storage 1003, by using the RAM 1002 as a working memory. The communication I/F 1004 performs communication via the network 1100 under the control of the CPU 1000.

In FIG. 8, the user environment identification service server 10 is configured by single hardware, but is not limited thereto. The user environment identification service server 10 may be configured by integrally controlling a plurality of server devices having the same configuration. The link service servers 20a and 20b and the content providing server 30 illustrated in FIG. 1 can be realized using the same configuration as the user environment identification service server 10, and therefore, explanation thereof will be omitted.

Figure 9:
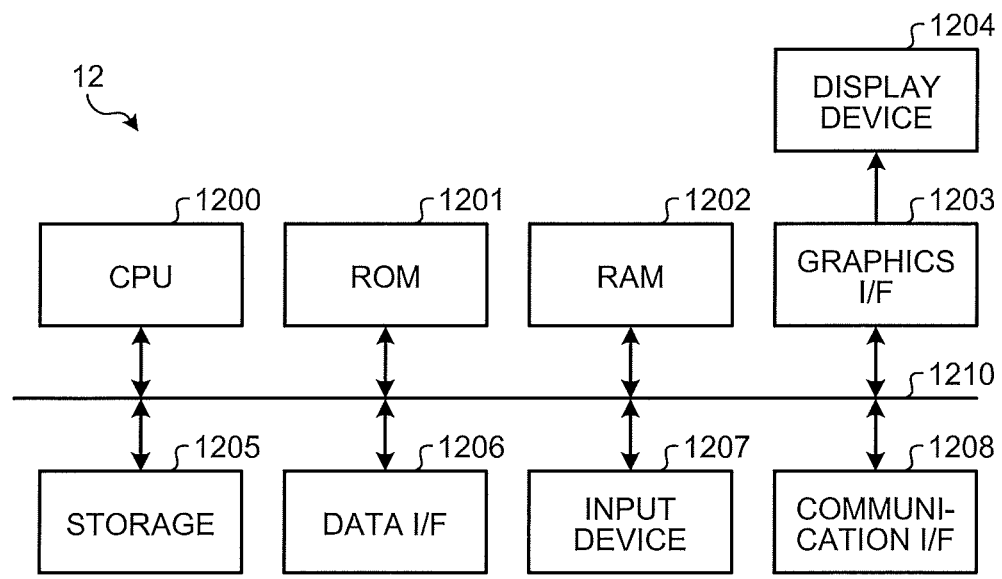
FIG. 9 is a block diagram illustrating an example of a hardware configuration of a registration terminal applicable to the embodiment.

FIG. 9 illustrates an example of a hardware configuration of the registration terminal 12 applicable to the embodiment. The registration terminal 12 illustrated in FIG. 9 includes a CPU 1200, a ROM 1201, a RAM 1202, and a graphics I/F 1203, all of which are connected to a bus 1210. In addition, a storage 1205, a data I/F 1206, an input device 1207, and a communication I/F 1208 are connected to the bus 1210.

The storage 1205 is a storage medium capable of storing data in a non-volatile manner, and is, for example, a hard disk drive, but is not limited thereto. For example, it may be possible to adopt a non-volatile semiconductor memory, such as a flash memory, as the storage 1205. The storage 1205 stores therein a program executed by the CPU 1200 and various kinds of data.

The CPU 1200 controls the entire registration terminal 12 in accordance with a program stored in the ROM 1201 and the storage 1205, by using the RAM 1202 as a working memory.

The graphics I/F 1203 converts a display control signal generated by the CPU 1200 to a signal that can be displayed by a display device 1204, and outputs the converted signal. The graphics I/F 1203 drives the display device 1204 based on the display control signal generated by the CPU 1200. The display device 1204 is driven by the graphics I/F 1203 and performs display corresponding to the display control signal.

The data I/F 1206 performs input and output of data with respect to an external apparatus. For example, an interface, such as a universal serial bus (USB) or Bluetooth (registered trademark), may be adopted as the data I/F 1206. The communication I/F 1208 performs communication via the network 1100 under the control of the CPU 1200.

The input device 1207 includes, for example, a pointing device, such as a mouse, and a keyboard, and accepts user input. A user can issue an instruction to the registration terminal 12 by operating the input device 1207 in accordance with display on the display device 1204, for example.

Figure 10:
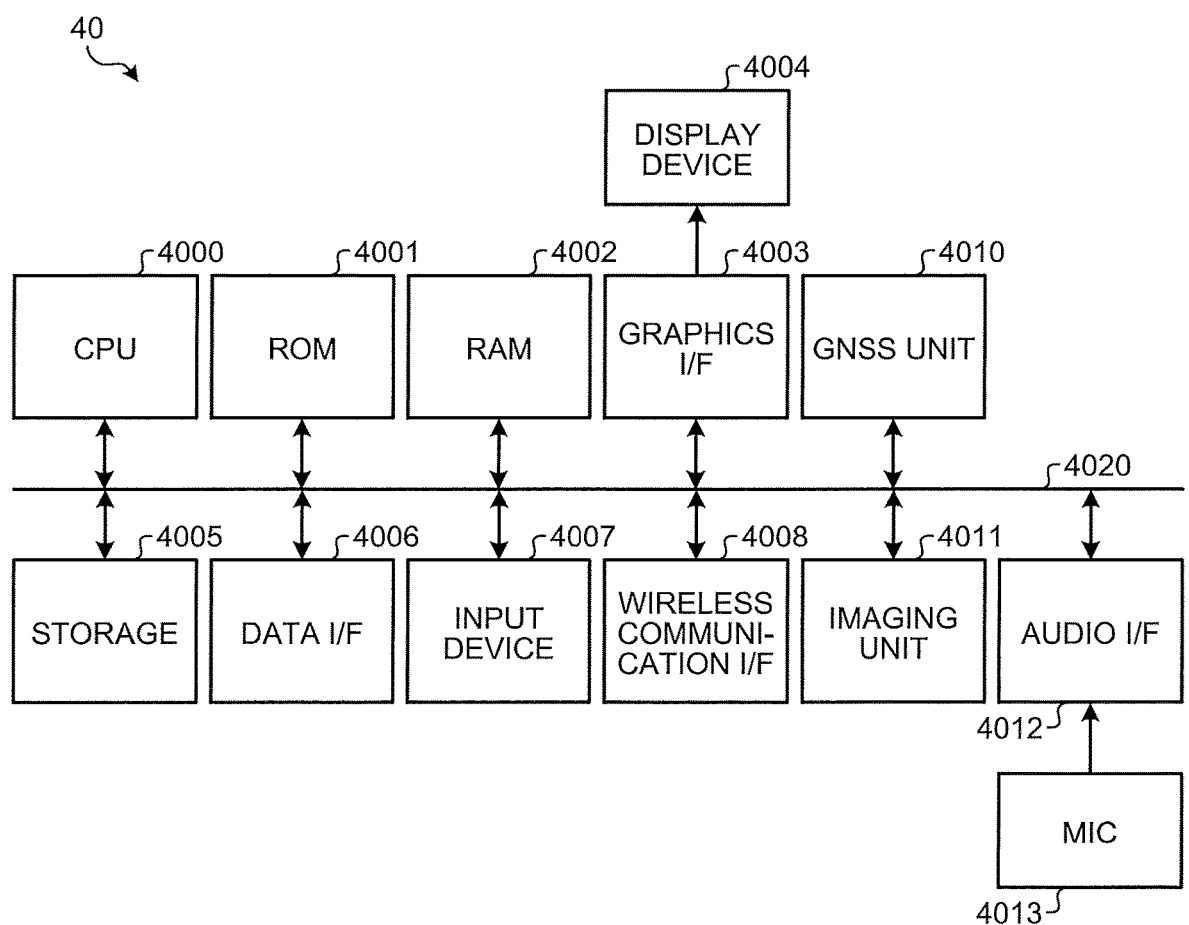
FIG. 10 is a block diagram illustrating an example of a hardware configuration of a user terminal applicable to the embodiment.

FIG. 10 illustrates an example of a hardware configuration of the user terminal 40 applicable to the embodiment. The user terminal 40 illustrated in FIG. 10 includes a CPU 4000, a ROM 4001, a RAM 4002, and a graphics I/F 4003, all of which are connected to a bus 4020. Further, a storage 4005, a data I/F 4006, an input device 4007, and a wireless communication I/F 4008 are connected to the bus 4020. Furthermore, a GNSS unit 4010, an imaging unit 4011, and an audio I/F 4012 are connected to the bus 4020.

The storage 4005 is a storage medium capable of storing data in a non-volatile manner, and is, for example, a non-volatile semiconductor memory, such as a flash memory, but is not limited thereto. For example, it may be possible to adopt a hard disk drive as the storage 4005. The storage 4005 stores therein a program executed by the CPU 4000 and various kinds of data. As the storage 4005 and the ROM 4001, a single writable non-volatile semiconductor memory or the like may be shared, for example.

The CPU 4000 controls the entire user terminal 40 in accordance with a program stored in the ROM 4001 and the storage 4005, by using the RAM 4002 as a working memory. The graphics I/F 4003 converts a display control signal generated by the CPU 4000 to a signal that can be displayed by a display device 4004, and outputs the converted signal.

The data I/F 4006 performs input and output of data with respect to an external apparatus. For example, an interface, such as a USB or Bluetooth (registered trademark), may be adopted as the data I/F 4006.

The graphics I/F 4003 drives the display device 4004 based on the display control signal generated by the CPU 4000. The display device 4004 includes, for example, a liquid crystal display (LCD). The display device 4004 is driven by the graphics I/F 4003, and performs display corresponding to the display control signal.

The input device 4007 accepts user input. A user can issue an instruction to the user terminal 40 by operating the input device 4007 in accordance with display on the display device 4004, for example. The input device 4007 and the display device 4004 are integrated and configured as a touch panel that outputs a control signal corresponding to a pressed position and provides an image on the display device 4004 in a transmissive manner.

The wireless communication I/F 4008 establishes a connection to the AP 41 using wireless communication under the control of the CPU 4000, and performs communication via the network 1100.

The GNSS unit 4010 receives a signal of a GNSS, and calculates a current location defined by the latitude and the longitude based on the received signal. The imaging unit 4011 includes an optical system, an imaging element, and a control drive circuit for the optical system and the imaging element, performs a predetermined process on an imaging signal that is output from the imaging element, and outputs a captured image based on a digital signal.

The audio I/F 4012 is connected to, for example, a microphone (MIC) 4013, converts an analog audio signal collected by the microphone 4013 to a digital audio signal, and outputs the digital audio signal to the bus 4020. The microphone 4013 may be a built-in device of the user terminal 40, or an external device that is used by being connected to the user terminal 40. When a mosquito sound as described above is used as the sound 51, it is preferable that the microphone 4013 selects a sound having a frequency of 15 kHz or higher and having a large gain at around a frequency of 17 kHz that is a frequency band of the mosquito sound.

Figure 11:
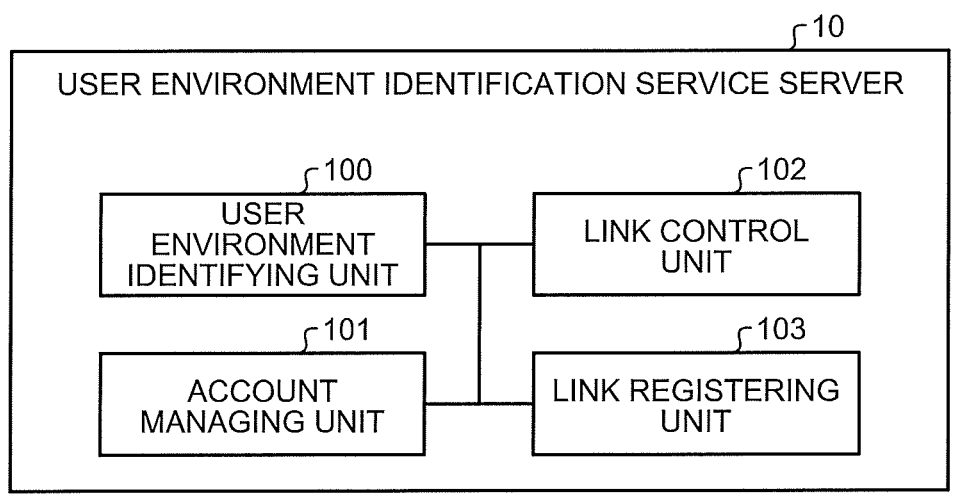
FIG. 11 is an exemplary functional block diagram for explaining functions of the user environment identification service server according to the embodiment.

FIG. 11 is an exemplary functional block diagram for explaining functions of the user environment identification service server 10 according to the embodiment. In FIG. 11, the user environment identification service server 10 includes a user environment identifying unit 100, an account managing unit 101, a link control unit 102, and a link registering unit 103. The user environment identifying unit 100, the account managing unit 101, the link control unit 102, and the link registering unit 103 are configured by causing the CPU 1000 to execute a program, but are not limited thereto. For example, a part or all of the user environment identifying unit 100, the account managing unit 101, the link control unit 102, and the link registering unit 103 may be configured by hardware circuits that operate in a cooperative manner.

The user environment identifying unit 100 functions as a search unit that searches through the link information DB 5 based on the environmental information transmitted from the user terminal 40, identifies an environment of a user, and acquires corresponding link information. For example, the user environment identifying unit 100 includes a function to extract feature information on an image, and when the environmental information transmitted from the user terminal 40 is an image, the user environment identifying unit 100 analyzes the image and extracts feature information. Feature information on an image is stored in the link information DB 5 in association with link information. The user environment identifying unit 100 searches through the link information DB 5 based on a piece of feature information that is obtained by analyzing the image transmitted from the user terminal 40, and identifies a piece of feature information having a high similarity to the piece of analyzed feature information among pieces of feature information stored in the link information DB 5. The user environment identifying unit 100 outputs a piece of link information associated with the piece of identified feature information, as link information corresponding to the image transmitted from the user terminal 40.

For another example, the user environment identifying unit 100 includes a function to analyze an audio signal, and when the environmental information transmitted from the user terminal 40 is an audio signal, the user environment identifying unit 100 analyzes the audio signal and detects an intermittent pattern, for example. An intermittent pattern of an audio signal is stored in the link information DB 5 in association with link information. The user environment identifying unit 100 searches through the link information DB 5 based on the intermittent pattern that is obtained by analyzing the audio signal transmitted from the user terminal 40, and identifies an intermittent pattern having a high similarity to the analyzed intermittent pattern among intermittent patterns stored in the link information DB 5. The user environment identifying unit 100 outputs link information associated with the identified intermittent pattern, as link information corresponding to the environmental information transmitted from the user terminal 40.

For still another example, location information indicating a location in a predetermined range is stored in the link information DB 5 in association with link information. When the environmental information transmitted from the user terminal 40 is location information, the user environment identifying unit 100 searches through the link information DB 5 based on the location information, and identifies a piece of location information including a location indicated by the location information that has been transmitted as the environmental information, among pieces of location information stored in the link information DB 5. The user environment identifying unit 100 outputs a piece of link information associated with the piece of identified location information, as link information corresponding to the environmental information transmitted from the user terminal 40.

The account managing unit 101 manages pieces of account information that are acquired from the first link service 2a (the link service server 20a) and the second link service 2b (the link service server 20b) at Step S10 and Step S11 in FIG. 5 and stored in the account information storage unit 4.

The account managing unit 101 further manages the identification information uid on the user terminal 40. For example, the account managing unit 101 generates unique identification information uid for each of user applications in response to an identification information issuance request that is issued when the user application is first activated in the user terminal 40. The account managing unit 101 transmits the generated identification information uid to the user terminal 40, and stores the identification information uid in, for example, the account information storage unit 4. In this case, the account managing unit 101 may store information (for example, a media access control (MAC) address) capable of identifying hardware of the user terminal 40 in the account information storage unit 4 in association with the identification information uid.

Further, when the content providing server 30 issues a request for predetermined account information, the account managing unit 101 extracts a piece of account information corresponding to the request from among pieces of account information stored in the account information storage unit 4, and transmits the piece of extracted account information to the content providing server 30. As described above, the account managing unit 101 has a function as an account information distributing unit that distributes account information to the content providing server 30.

The link control unit 102 returns link information, which is acquired by the user environment identifying unit 100 based on the environmental information transmitted from the user terminal 40, to the user terminal 40 that has transmitted the environmental information. In some cases, a plurality of pieces of link information may be acquired based on the environmental information transmitted from the user terminal 40. In this case, the link control unit 102 transmits the plurality of pieces of link information to the user terminal 40 that has transmitted the environmental information. The user terminal 40 can select, via the user application, a piece of desired link information from among the pieces of link information transmitted from the user environment identification service server 10.

Further, the link control unit 102 transmits, to the content providing server 30, an SDK for customizing a user application, in accordance with a request from the content providing server 30, for example. In this case, the link control unit 102 transmits module identification information for identifying the SDK to the content providing server 30 in association with the SDK. As described above, the link control unit 102 functions as a module distributing unit that distributes an SDK used by the third provider to customize a user application.

The link registering unit 103 registers the link information and the environmental information in the user environment identification service server 10. For example, the link registering unit 103 provides, on the registration terminal 12, a registration screen for registering the link information and the environmental information in the user environment identification service server 10. Further, the link registering unit 103 stores the link information and the environmental information in the link information DB 5 in accordance with pieces of information that are input in accordance with the registration screen on the registration terminal 12.

Figure 12:
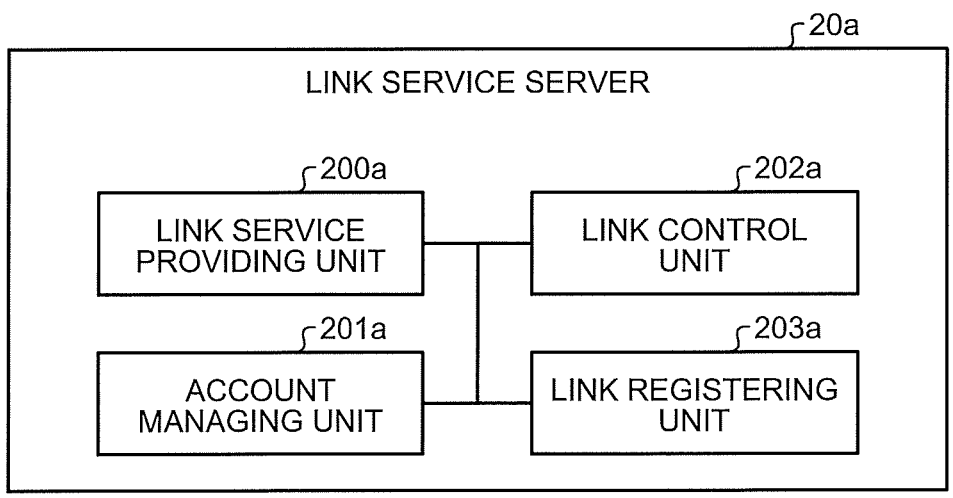
FIG. 12 is an exemplary functional block diagram for explaining functions of a link service server according to the embodiment.
Figure 13:
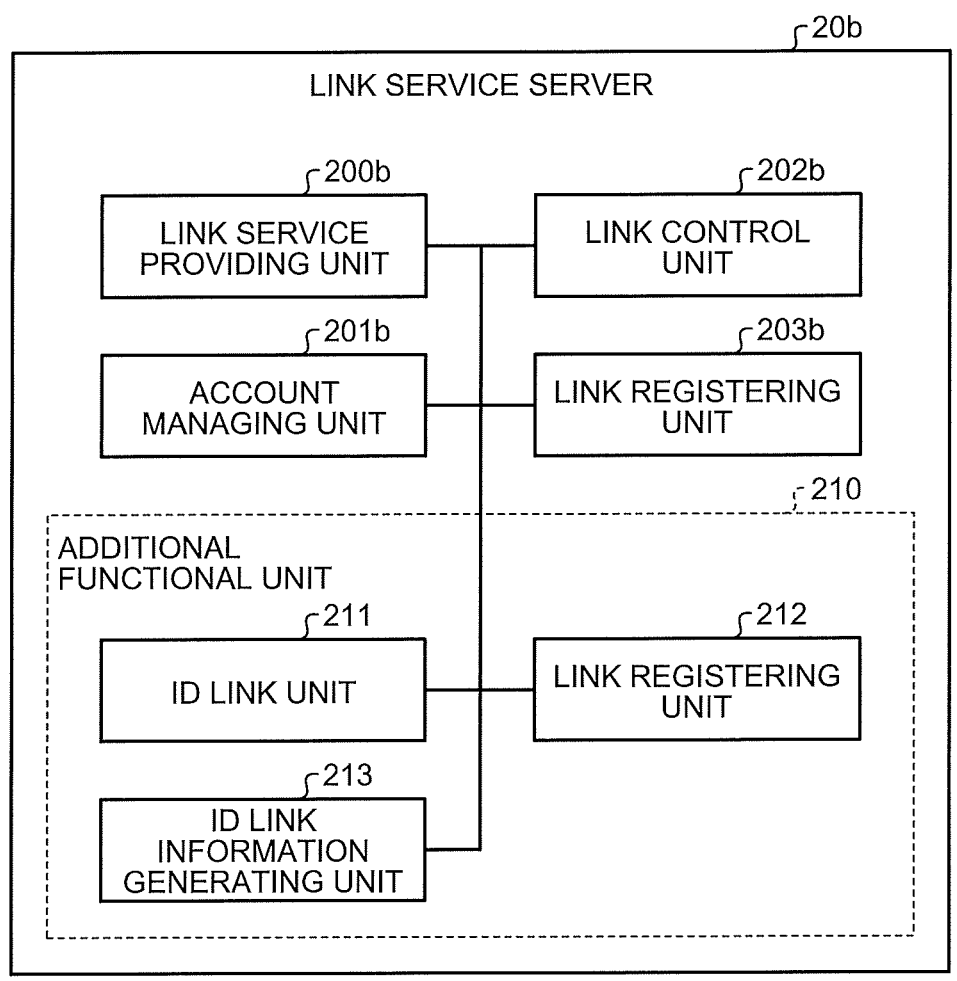
FIG. 13 is an exemplary functional block diagram for explaining functions of the link service server according to the embodiment.

With reference to FIG. 12 and FIG. 13, functions of the link service servers 20a and 20b according to the embodiment will be described. The link service servers 20a and 20b are operated by the second providers (the second provider #1 and the second provider #2, respectively), which are different from the first provider who operates the user environment identification service server 10. In the user environment identification service provided by the user environment identification service server 10 according to the embodiment, the identification information uid is added to a URL and the URL is used as the link information.

A fashion of adding the identification information uid to the URL is specific to the user environment identification service 1, and therefore, in some cases, the first link service 2a and the second link service 2b provided by the link service servers 20a and 20b may be incompatible with this fashion. In this example, it is assumed that the first link service 2a is compatible with this fashion and the second link service 2b is incompatible with this fashion, for the sake of explanation.

In general, a parameter, such as the identification information uid, is added to the URL such that the parameter continues immediately after a path portion representing a path of the URL with a predetermined delimiter (a sign "?" or the like) interposed between the path portion and the parameter. For example, in a URL of "http://1.example.com/rc/slot01/index.php?uid=[uid]", a parameter of "uid=[uid]" is added after a path portion of "rc/slot01/index.php" with a delimiter of "?" interposed between the path portion and the parameter. In the parameter of "uid=[uid]", the first "uid" indicates a parameter name (the identification information uid in this example), and "[uid]" provided after a sign "=" indicates a portion in which a parameter value is assigned, and is replaced with a parameter value.

FIG. 12 is an exemplary functional block diagram for explaining functions of the link service server 20a that provides the first link service 2a that is compatible with the fashion of adding the identification information uid to the link information in the embodiment. In FIG. 12, the link service server 20a includes a link service providing unit 200a, an account managing unit 201a, a link control unit 202a, and a link registering unit 203a. The link service providing unit 200a, the account managing unit 201a, the link control unit 202a, and the link registering unit 203a are configured by causing a CPU included in the link service server 20a to execute a program, but are not limited thereto. For example, a part or all of the link service providing unit 200a, the account managing unit 201a, the link control unit 202a, and the link registering unit 203a may be configured by hardware circuits that operate in a cooperative manner.

The link service providing unit 200a provides, to the user terminal 40 that has accessed the link service server 20a in accordance with link information, a service corresponding to the link information. More specifically, the link service providing unit 200a stores setting for the service corresponding to the link information. Further, the link service providing unit 200a generates a screen of the service corresponding to the link information, and provides the generated screen on the user terminal 40. Furthermore, upon receiving an instruction corresponding to the screen provided on the user terminal 40 from the user terminal 40, the link service providing unit 200a performs a process in accordance with the instruction.

The account managing unit 201a generates and manages account information for permitting setting for a service provided by the link service server 20a, in accordance with a request. For example, the account managing unit 201a generates account information in accordance with a request from the account managing unit 101 of the user environment identification service server 10, and transmits the generated account information to the account managing unit 101.

The link control unit 202a accepts link information transmitted from outside, e.g., from the user terminal 40, and analyzes the accepted link information. As a result of analysis of the link information, if a parameter, such as the identification information uid, has been added to the link information, the link control unit 202a extracts the added parameter. Further, the link control unit 202a generates link information to make a link with other services, for example. Furthermore, the link control unit 202a transmits link information, which is registered by the link registering unit 203a to be described later and to which the identification information uid is added, to a designated transmission destination.

The link registering unit 203a registers, in the link service server 20a, link information to be transmitted from the link control unit 202a. For example, the link registering unit 203a provides, on the registration terminal 12, a registration screen for registering the link information in the link service server 20a. The registration screen includes an input portion that enables writing for adding the identification information uid to the link information generated by the link control unit 202a, for example. For example, the link information (URL) generated by the link control unit 202a is displayed in the input portion in advance, and a user (for example, the third provider) additionally inputs, to the input portion, a description of an identification information adding portion (for example, "uid=[uid]" as described above) for adding the identification information uid. By replacing the description "[uid]" in the identification information adding portion with the identification information uid, the identification information uid is added to the link information. The link registering unit 203a registers the link information in the link service server 20a in accordance with pieces of information that are input based on the registration screen on the registration terminal 12.

FIG. 13 is an exemplary functional block diagram for explaining functions of the link service server 20b that provides the second link service 2b that is incompatible with the fashion of adding the identification information uid to the link information in the embodiment. In FIG. 13, the link service server 20b includes a link service providing unit 200b, an account managing unit 201b, a link control unit 202b, a link registering unit 203b, and an additional functional unit 210. The additional functional unit 210 includes an ID link unit 211, a link registering unit 212, and an ID link information generating unit 213.

The link service providing unit 200b, the account managing unit 201b, the link control unit 202b, and the link registering unit 203b, as well as the ID link unit 211, the link registering unit 212, and the ID link information generating unit 213 that are included in the additional functional unit 210 are configured by causing a CPU included in the link service server 20b to execute a program, but are not limited thereto. For example, a part or all of the link service providing unit 200a, the link service providing unit 200b, the account managing unit 201b, the link control unit 202b, and the link registering unit 203b, as well as the ID link unit 211, the link registering unit 212, and the ID link information generating unit 213 that are included in the additional functional unit 210 may be configured by hardware circuits that operate in a cooperative manner.

The link service providing unit 200b, the account managing unit 201b, and the link control unit 202b have the same functions as those of the link service providing unit 200a, the account managing unit 201a, and the link control unit 202a illustrated in FIG. 12, respectively, and therefore, explanation thereof will be omitted.

The link registering unit 203b provides, on the registration terminal 12, a registration screen for registering link information in the link service server 20b, and registers link information input in the registration screen on the registration terminal 12 in the link service server 20b. In this case, the link registering unit 203b does not permit input for adding a parameter including the identification information uid to the link information generated by the link control unit 202b, for example.

The additional functional unit 210 adds, to the link service server 20b, a function of adding a parameter to the link information generated by the link control unit 202b. The additional functional unit 210 is added to the link service server 20b in response to a request from the first provider for example, and thus the link service server 20b is customized. As indicated at Step S9 in FIG. 5, it is necessary to perform this customization before the first provider acquires the account information from the second provider #2 at Step S11.

The ID link unit 211 of the additional functional unit 210 analyzes the link information that is transmitted from outside, e.g., from the user terminal 40, and that is accepted by the link control unit 202b. As a result of analysis of the link information, if the identification information uid has been added to the link information, the ID link unit 211 extracts the added identification information uid.

When the link registering unit 203b registers link information, which is to be transmitted from the link control unit 202b, in the link service server 20b, the link registering unit 212 adds the function of adding the identification information uid to the link information. For example, the link registering unit 203b provides, on the registration terminal 12, a registration screen for registering link information in the link service server 20b. In this case, the link registering unit 212 generates link information in which a description of an identification information adding portion (for example, "uid=[uid]" as described above) is added in advance. The link registering unit 203b provides, on the registration screen, the generated link information to which the identification information adding portion is added.

In this case, a user (for example, the third provider) need not perform operation of additionally input a description of the identification information adding portion. Therefore, it becomes possible to reduce a burden to input information in the registration screen, and it becomes possible to prevent an input error.

The ID link information generating unit 213 embeds the identification information uid extracted by the ID link unit 211 into the identification information adding portion of the link information that is registered by the link registering units 203b (the description of "[uid]" in the identification information adding portion is replaced). Consequently, the identification information uid is added to the link information. The link control unit 202b transmits the link information, to which the identification information uid is added, to a designated transmission destination.

Figure 14:
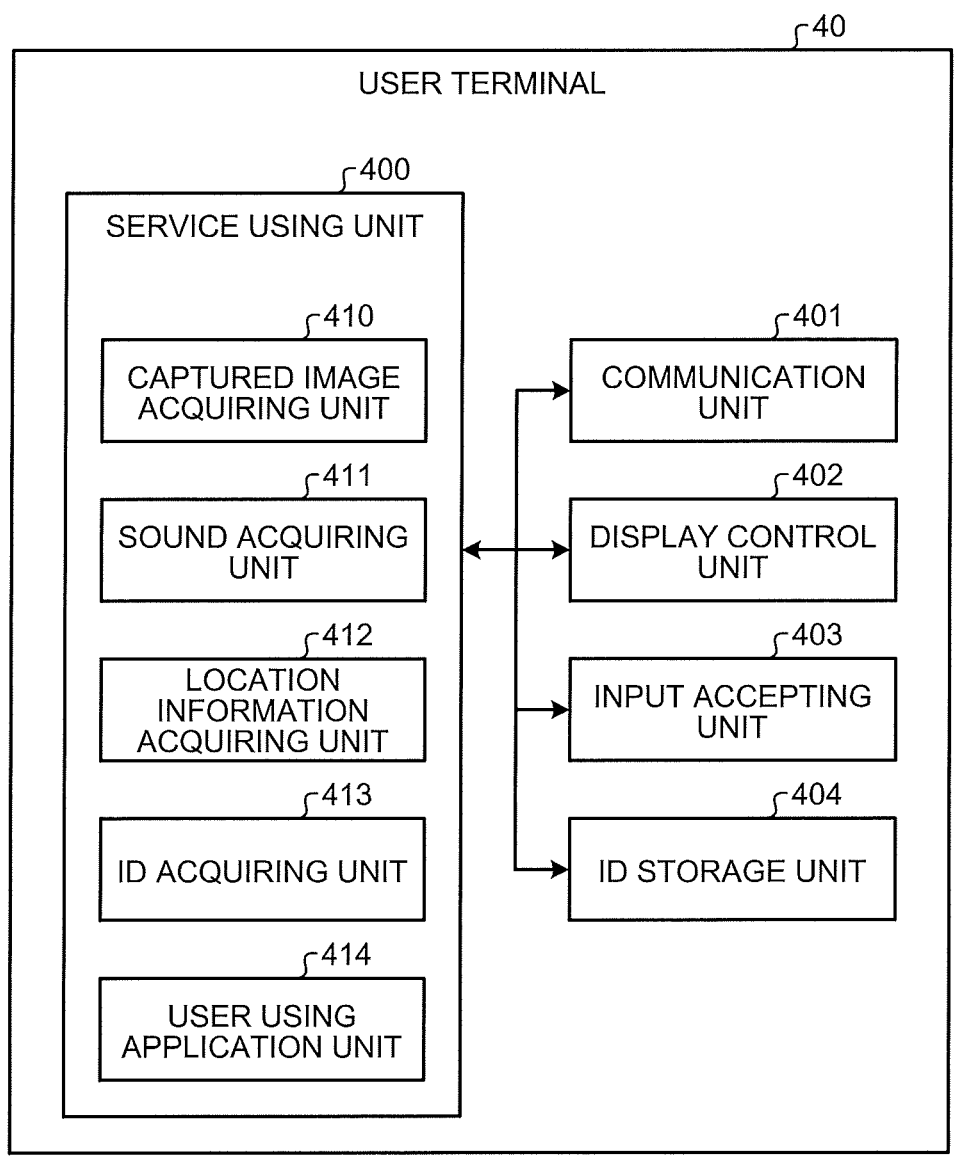
FIG. 14 is an exemplary functional block diagram for explaining functions of the user terminal according to the embodiment.

FIG. 14 is an exemplary functional block diagram for explaining functions of the user terminal 40 according to the embodiment. In FIG. 14, the user terminal 40 includes a service using unit 400, a communication unit 401, a display control unit 402, an input accepting unit 403, and an ID storage unit 404. The service using unit 400, the communication unit 401, the display control unit 402, and the input accepting unit 403 are configured by causing the CPU 4000 to execute a program. A predetermined storage area of the storage 4005 of the user terminal 40 is adopted as the ID storage unit 404, for example. The communication unit 401, the display control unit 402, and the input accepting unit 403 may be configured by hardware circuits that operate in a cooperative manner.

The service using unit 400 is configured by installing, in the user terminal 40, a user application that is customized by the third provider from a certain user application by using the SDK provided by the first provider through the processes from Step S13 to Step S15 illustrated in FIG. 5, and by causing the CPU 4000 to execute the installed user application. The service using unit 400 includes a captured image acquiring unit 410, a sound acquiring unit 411, a location information acquiring unit 412, an ID acquiring unit 413, and a user using application unit 414.

The captured image acquiring unit 410 controls the imaging unit 4011 and acquires a captured image. The sound acquiring unit 411 acquires an audio signal that is collected by the microphone 4013 and output from the audio I/F 4012. The sound acquiring unit 411 may further perform a process of analyzing the acquired audio signal and detecting an intermittent pattern of the sound. The location information acquiring unit 412 acquires location information from the GNSS unit 4010.

The ID acquiring unit 413 acquires the identification information uid unique to the service using unit 400. For example, the ID acquiring unit 413 performs communication with the user environment identification service server 10 when the service using unit 400 is first activated after the service using unit 400 is installed in the user terminal 40, and requests issuance of the identification information uid. The user environment identification service server 10 causes the account managing unit 101 to generate the identification information uid in response to the request, and to transmit the identification information uid to the user terminal 40. The identification information uid transmitted from the user environment identification service server 10 is received by the user terminal 40 and acquired by the ID acquiring unit 413. The ID acquiring unit 413 stores the acquired identification information uid in the ID storage unit 404.

The service using unit 400 holds a module ID included in the SDK that is provided from the first provider to configure the service using unit 400. The ID acquiring unit 413 can further acquire the module ID and store the module ID in the ID storage unit 404.

The user using application unit 414 includes a function provided by, for example, the third provider. For example, the user using application unit 414 generates a user interface of the service using unit 400.

The communication unit 401 controls the wireless communication I/F 4008, establishes communication with the AP 41, and performs communication over the network 1100. The display control unit 402 generates a display control signal for displaying a screen in accordance with the user interface generated by the user using application unit 414, for example. Further, the input accepting unit 403 accepts input corresponding to operation performed on the input device 4007.

Figure 15:
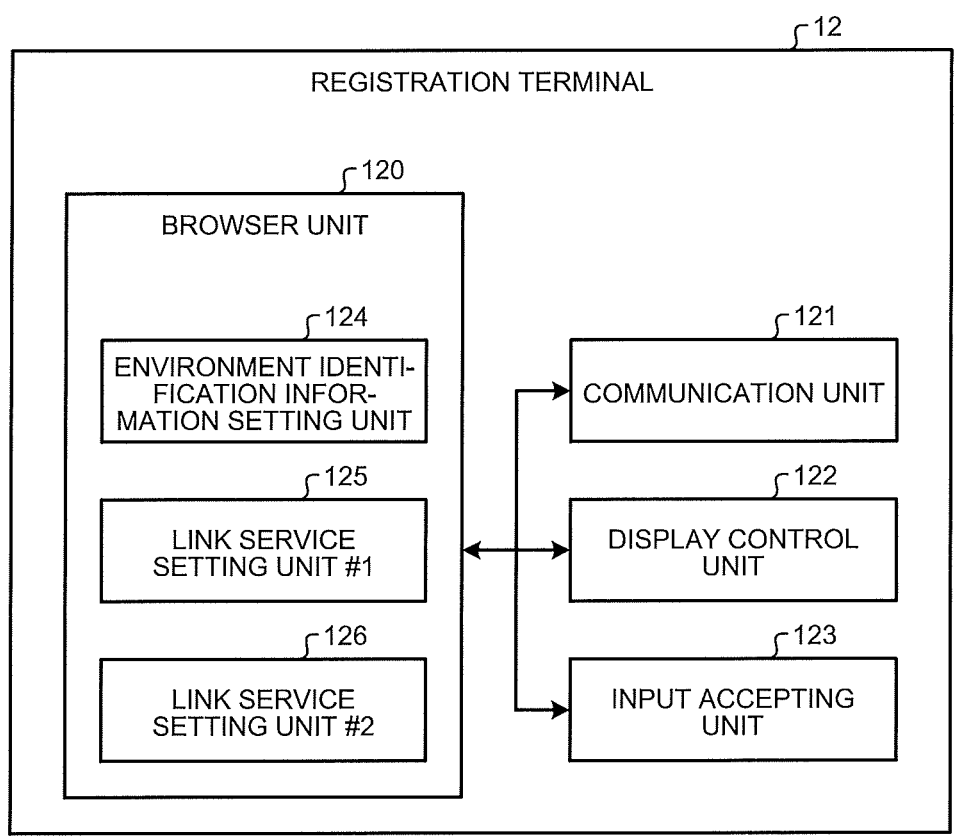
FIG. 15 is an exemplary functional block diagram for explaining functions of the registration terminal according to the embodiment.

FIG. 15 is an exemplary functional block diagram for explaining functions of the registration terminal 12 according to the embodiment. In FIG. 15, the registration terminal 12 includes a browser unit 120, a communication unit 121, a display control unit 122, and an input accepting unit 123. The browser unit 120, the communication unit 121, the display control unit 122, and the input accepting unit 123 are configured by causing the CPU 1200 to execute a program, but are not limited thereto. For example, a part or all of the browser unit 120, the communication unit 121, the display control unit 122, and the input accepting unit 123 may be configured by hardware circuits that operate in a cooperative manner.

The browser unit 120 is configured by a browser application (hereinafter, referred to as a "browser") that is equivalent to a browser application installed in a general computer. The browser operates on the CPU 1200, reads a file that is written in accordance with Hypertext Markup Language (HTML) for example, and performs predetermined operation. In FIG. 15, the browser unit 120 includes an environment identification information setting unit 124 and link service setting units 125 and 126. The link service setting units 125 and 126 are illustrated as a link service setting unit #1 and a link service setting unit #2 in FIG. 15, respectively.

The environment identification information setting unit 124 corresponds to the registration screen that is provided by the link registering unit 103 in the user environment identification service server 10 as described above. When the user environment identification service server 10 is accessed from the registration terminal 12 using the browser, a program for configuring the registration screen is loaded on the browser, and the environment identification information setting unit 124 is generated in the browser unit 120 by the program.

Similarly, the link service setting unit 125 corresponds to the registration screen that is provided by the link registering unit 203a in the link service server 20a as described above. When the link service server 20a is accessed from the registration terminal 12 using the browser, a program for configuring the registration screen is loaded on the browser, and the link service setting unit 125 is generated in the browser unit 120 by the program.

The link service setting unit 126 corresponds to the registration screen that is provided by the link registering unit 203b in the link service server 20b as described above. Similarly to the link service setting unit 125 as described above, when the link service server 20b is accessed from the registration terminal 12 using the browser, a program for configuring the registration screen is loaded on the browser, and the link service setting unit 126 is generated in the browser unit 120 by the program.

The communication unit 121 controls the communication I/F 1208 and performs communication over the network 1100. The display control unit 122 generates a display control signal for displaying each of the registration screens on the display device 1204 based on display control information from the environment identification information setting unit 124 and the link service setting units 125 and 126 generated in the browser unit 120. Further, the input accepting unit 123 accepts input corresponding to operation performed on the input device 1207.

While the environment identification information setting unit 124, the link service setting unit 125, and the link service setting unit 126 are configured on the single registration terminal 12 for the sake of explanation, the present invention is not limited to this example. That is, the environment identification information setting unit 124, the link service setting unit 125, and the link service setting unit 126 may be configured on different information processing apparatuses.

Further, while the environment identification information setting unit 124, the link service setting unit 125, and the link service setting unit 126 are simultaneously configured on the registration terminal 12 in FIG. 15 for the sake of explanation, the present invention is not limited to this example. For example, a user who uses the registration terminal 12 may select one or two of the environment identification information setting unit 124, the link service setting unit 125, and the link service setting unit 126 and install the selected units in the registration terminal 12.

Concrete Example of Registration Screens According to Embodiment

Examples of the registration screens provided on the registration terminal 12 according to the embodiment will be described in detail below. First, with reference to FIG. 16 to FIG. 18, an example of a slot game management screen for managing the slot game service as described above with reference to FIGS. 3A and 3B will be described. In this example, it is assumed that the slot game management screen is incompatible with the fashion of adding the identification information uid to the link information, and is provided on the registration terminal 12 by the link service server 20b that provides the second link service 2b that is customized to add the identification information uid to the link information. That is, each of the screens illustrated in FIG. 16 to FIG. 18 is displayed on the registration terminal 12 by the link service setting unit 126 that has been loaded from the link service server 20b onto the browser unit 120 of the registration terminal 12.

For example, the third provider logs into the link service server 20b through the registration terminal 12 using the account information #2 that is sent from the second provider at Step S20' in FIG. 6. The link service server 20b performs an authentication process based on the account information #2 used for the login for example, and if authentication is successful, the link service server 20b provides the slot game management screen on the registration terminal 12.

FIG. 16, FIGS. 17A and 17B, and FIG. 18 illustrate examples of a main menu screen 600a, a setting screen 600b, and a report screen 600c in a slot game management screen 6 applicable to the embodiment, respectively. The slot game management screen 6 includes a menu region 60 in common in all of the screens as illustrated in FIG. 16, FIGS. 17A and 17B, and FIG. 18. The menu region 60 includes a title 61 of the screen, tabs 62a, 62b, and 62c, and a logout button 63 for logging out of the slot game management screen 6. The tabs 62a, 62b, and 62c switch display of the slot game management screen 6 to the main menu screen 600a, the setting screen 600b, and the report screen 600c, respectively, in accordance with operation.

Figure 16:
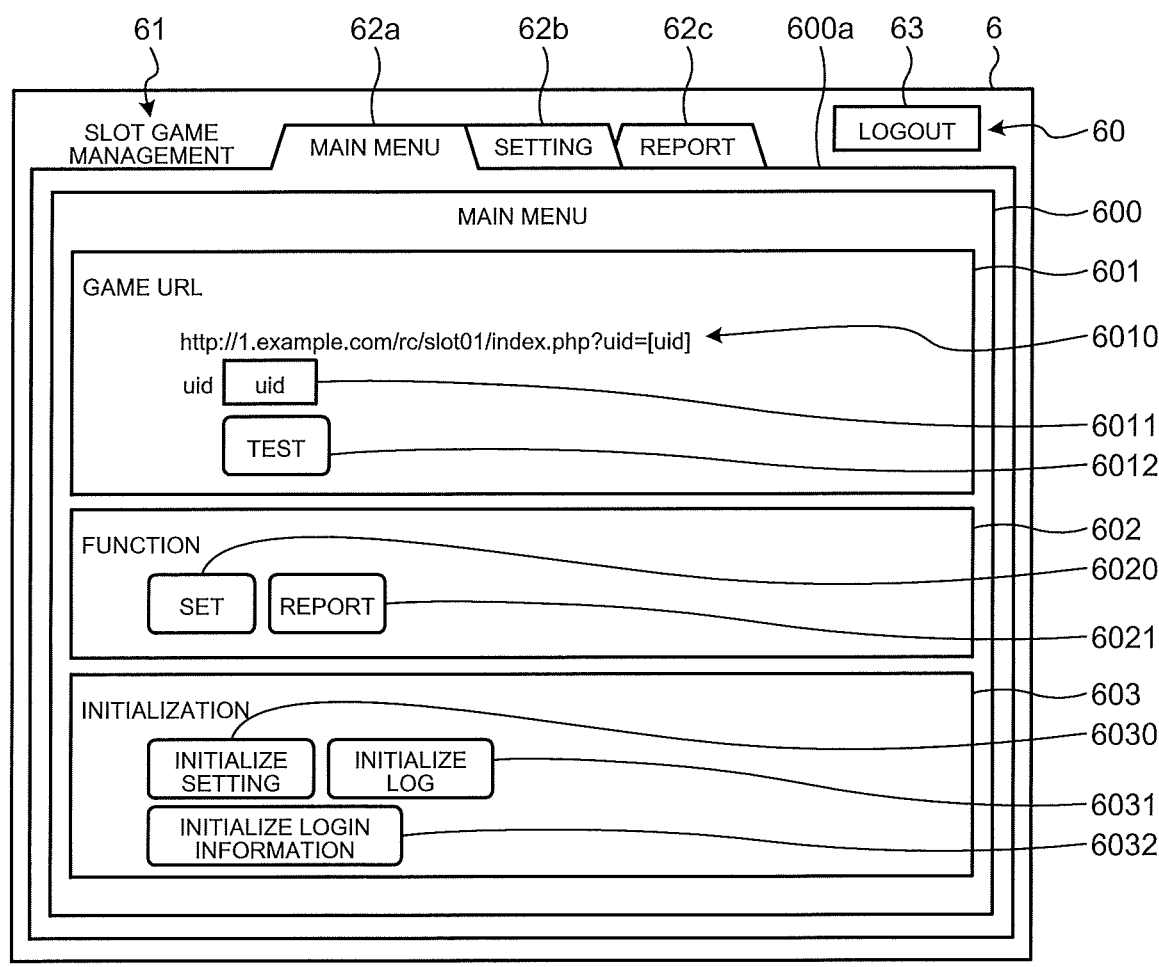
FIG. 16 is a diagram for explaining an example of a slot game management screen applicable to the embodiment.

FIG. 16 illustrates an example of the main menu screen 600a that is displayed when the tab 62a is specified in the menu region 60. In the example in FIG. 16, the main menu screen 600a includes a game URL display region 601, a function setting region 602, and an initialization region 603.

The game URL display region 601 includes a URL display region 6010, a uid input region 6011, and a button 6012. The URL display region 6010 displays a URL of a slot game managed by the slot game management screen 6. For example, the second link service 2b (the link service server 20b) generates a URL of the slot game in accordance with the account information that is acquired by the user environment identification service 1 at Step S10 in FIG. 5. The URL displayed in the URL display region 6010 is a URL corresponding to the account information #2 that is used at the time of login to the link service server 20b. A URL of "http://1.example.com/rc/slot01/index.php?uid=[uid]" displayed in the URL display region 6010 includes, in advance, the identification information adding portion "uid=[uid]" for adding the identification information uid to a URL of "http://1.example.com/rc/slot01/index.php" of the slot game.

The button 6012 is a button for performing a test of the slot game managed by the slot game management screen 6. The uid input region 6011 is a region for inputting the identification information uid used for the test.

The function setting region 602 includes buttons 6020 and 6021. The buttons 6020 and 6021 are buttons for switching display to the setting screen 600b and the report screen 600c, respectively, and implement the same functions as those of the tabs 62b and 62c in the menu region 60.

The initialization region 603 includes buttons 6030, 6031, and 6032. The button 6030 is a button for initializing setting of the slot game that is indicated by the URL displayed in the URL display region 6010 of the game URL display region 601. The button 6031 is a button for initializing a log related to the slot game. The button 6032 is a button for initializing login information related to the account information #2 with which current login is performed, for example.

Figure 17A:
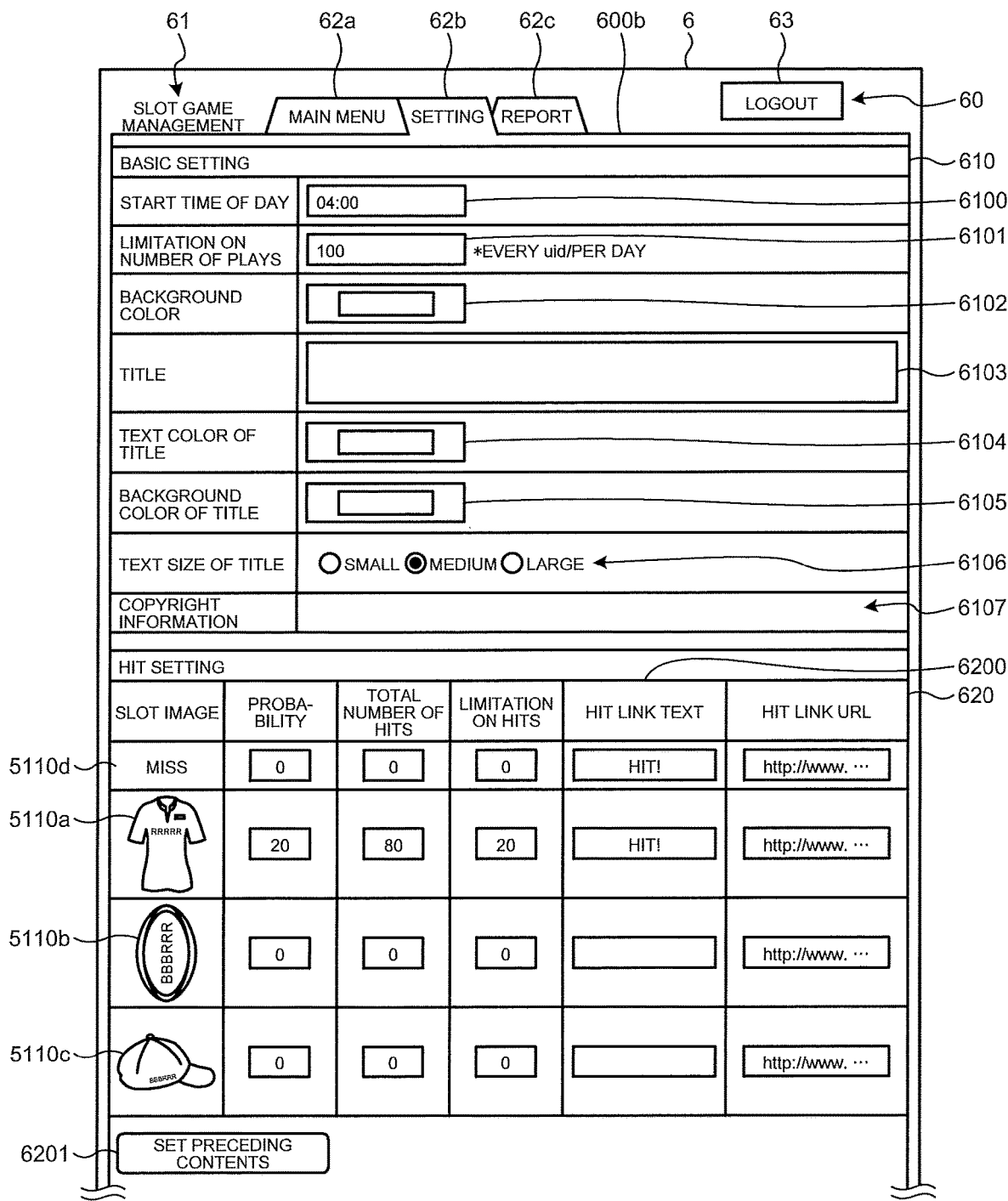
FIG. 17A is a diagram for explaining an example of the slot game management screen applicable to the embodiment.
Figure 17B:
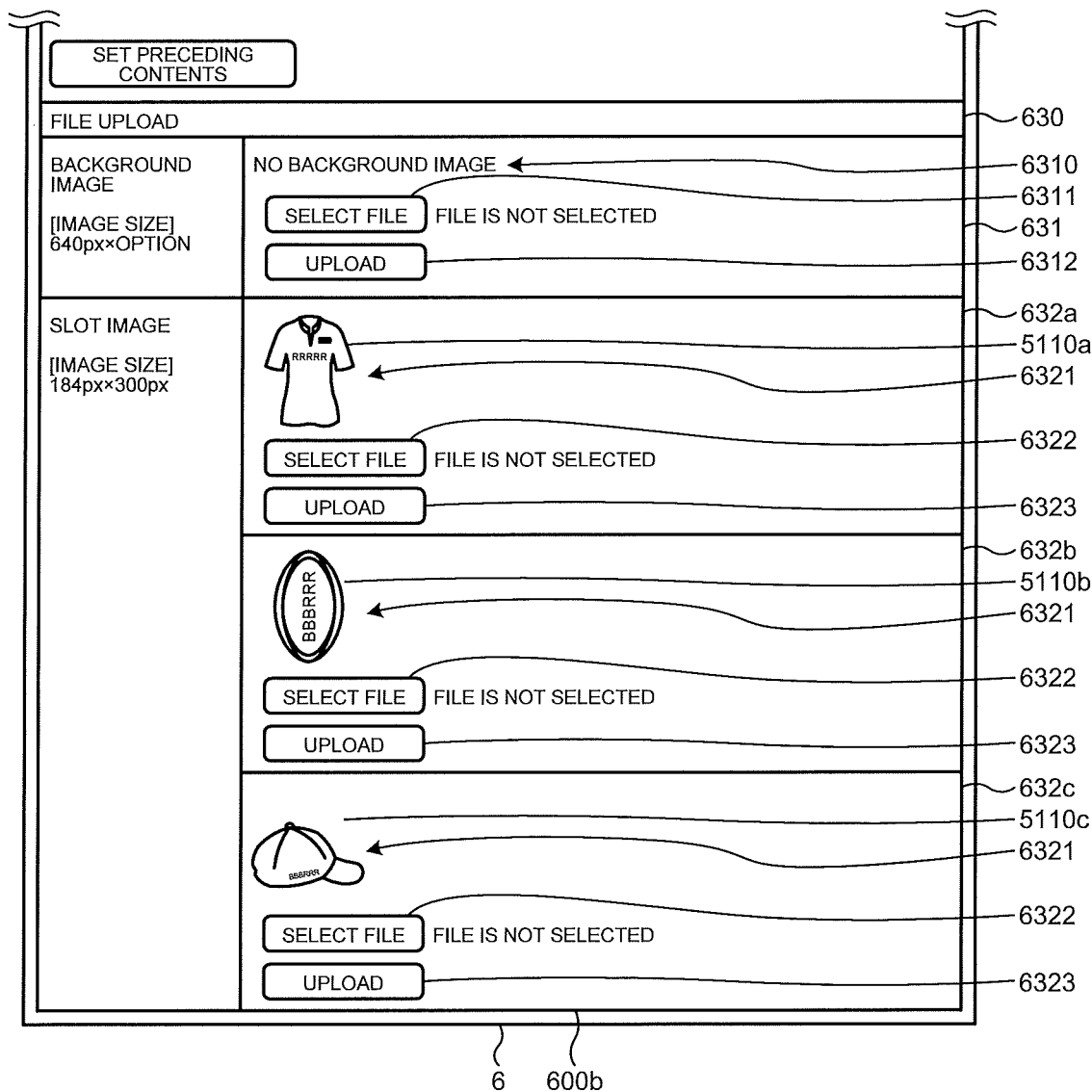
FIG. 17B is a diagram for explaining an example of the slot game management screen applicable to the embodiment.
Figure 18:
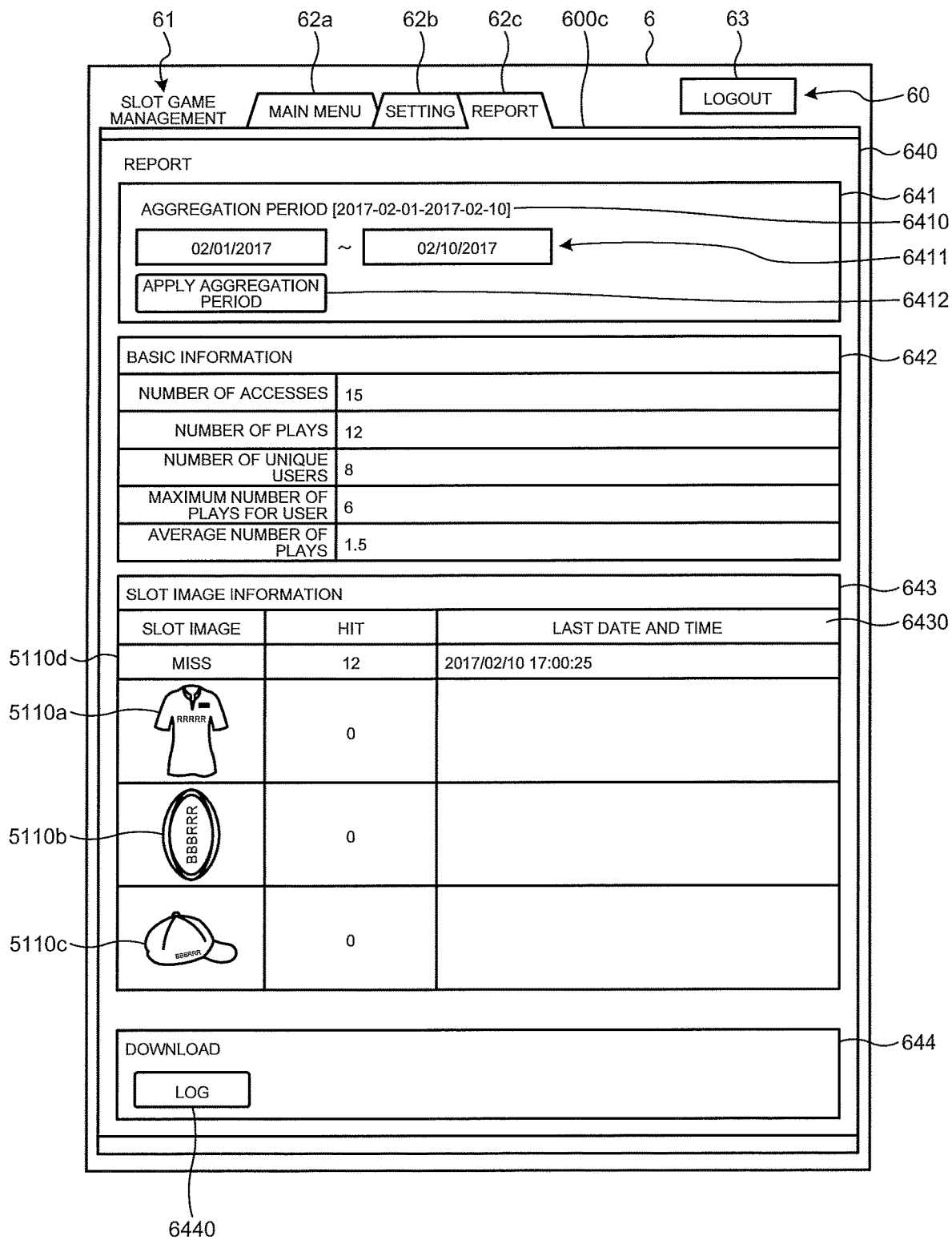
FIG. 18 is a diagram for explaining an example of the slot game management screen applicable to the embodiment.

FIG. 17A and FIG. 17B illustrate an example of the setting screen 600b that is displayed when the tab 62b is specified in the menu region 60. In this example, an upper portion of the setting screen 600b including the menu region 60 is illustrated in FIG. 17A, and a portion continuing to the bottom end is illustrated in FIG. 17B, for the sake of explanation. In addition, in FIG. 17A and FIG. 17B, the same components as those illustrated in FIG. 3A and FIG. 3B as described above are denoted by the same reference signs, and detailed explanation thereof will be omitted.

The upper portion of the setting screen 600b illustrated in FIG. 17A includes a basic setting region 610, a hit setting region 620, and a button 6201. The portion continuing to the bottom end of the setting screen 600b illustrated in FIG. 17B includes a file upload region 630.

In FIG. 17A, the basic setting region 610 is a region for performing basic setting for the slot game managed by the slot game management screen 6. In the basic setting region 610, a start time of a day for the slot game is input in an input region 6100. An upper limit of the number of plays of the game per day is input in an input region 6101 for inputting a limitation on the number of plays for a single piece of identification information uid.

An input region 6102 is a region for specifying a background color of the slot screen 510 illustrated in FIG. 3A. In the input region 6102, for example, a color palette is displayed in accordance with operation, and a user can set the background color of the slot screen 510 by specifying a desired color in the color palette. An input region 6103 is a region for inputting text of a title displayed in the slot screen 510. Input regions 6104, 6105, and 6106 are regions for inputting a text color, a background color, and a text size of the title displayed in the slot screen 510. In the input regions 6104 and 6105, color palettes are displayed in accordance with operation, and it is possible to specify desired colors in the color palettes. An input region 6107 is a region for inputting copyright information on the slot screen 510.

The hit setting region 620 is a region for setting hit in the slot. In the hit setting region 620, a table 6200 is displayed, in which records each having items of "slot image", "probability", "total number of hits", "limitation on hits", "hit link text", and "hit link URL" are included.

In the item of "slot image", information indicating a slot image to be displayed in each of the slot portions 511a, 511b, and 511c of the slot screen 510 is displayed. In this example, the slot images 5110a, 5110b, and 5110c that are already set are displayed in the item of "slot image" of respective records in the second to the fourth rows; however, the present invention is not limited to this example. For example, thumbnail images that are obtained by reducing corresponding slot images may be displayed in the item of "slot image". Each of the slot images 5110a, 5110b, and 5110c displayed in the item of "slot image" can be registered and updated in the file upload region 630 in FIG. 17B. In this example, an image 5110d indicating "miss" is displayed in the item of "slot image" of the record in the first row.

The items of "probability", "total number of hits", and "limitation on hits" are regions for inputting values related to the probability and hits in the slot game. The item of "probability" is a region for inputting a value of the probability that the slot image provided in the item of "slot image" of the record is hit in the slot game. The item of "total number of hits" is a region for inputting a total number of hits using the slot image provided in the item of "slot image" of the record. The item of "limitation on hits" is a region for inputting an upper limit of the number of hits per day using the slot image provided in the item of "slot image" of the record, for example.

The item of "hit link text" is a region for inputting text to be displayed in the slot screen 510 when the slot image provided in the item of "slot image" of the record is hit. The text input in the item of "hit link text" is displayed on the button 513 in the slot screen 510 illustrated in FIG. 3B, for example.

The item of "hit link URL" is a region for inputting an URL serving as the link information indicating a link destination when the slot image provided in the item of "slot image" of the record is hit. In the item of "hit link URL", a URL including the identification information adding portion (for example, "uid=[uid]") is input. In this example, a URL is input in the item of "hit link URL" of the record in each of the second to the fourth rows of the table 6200, so that the link information is set, which is to be used when each of the slot images 5110a, 5110b, and 5110c displayed in the corresponding item of "slot image" is hit.

The button 6201 is a button for setting a slot game with the setting contents input in the basic setting region 610 and the hit setting region 620. The registration terminal 12 transmits the setting contents input in the basic setting region 610 and the hit setting region 620 to the link service server 20b in accordance with operation on the button 6201. The link service server 20b stores the setting transmitted from the registration terminal 12 in association with the URL that is displayed in the URL display region 6010 in the game URL display region 601, for example.

In FIG. 17B, the file upload region 630 is a region for uploading a background image and each of the slot images 5110a, 5110b, and 5110c used in the slot game managed by the slot game management screen 6 to the link service server 20b. The file upload region 630 includes a background image upload region 631 and slot image upload regions 632a, 632b, and 632c.

The background image upload region 631 is a region for uploading, to the link service server 20b, an image to be displayed as a background of the slot screen 510, and includes an image display region 6310 and buttons 6311 and 6312. The button 6311 is a button for selecting an image file used as a background image, and displays a file selection dialog, which is normally installed in an operating system (OS) of the registration terminal 12, in accordance with operation, for example. An image based on the image file selected in accordance with operation on the button 6311 is displayed in the image display region 6310.

The button 6312 is a button for uploading, to the link service server 20b, the image file selected by the button 6311 as a background image file. The registration terminal 12 transmits the image file that is selected by operation on the button 6311 to the link service server 20b in accordance with operation on the button 6312. The link service server 20b stores the background image file transmitted from the registration terminal 12 in association with the URL that is displayed in the URL display region 6010 in the game URL display region 601, for example.

The slot image upload regions 632a, 632b, and 632c have the same configuration as that of the background image upload region 631 as described above. Specifically, the slot image upload region 632a includes, for example, an image display region 6320 and buttons 6321 and 6322. The button 6321 is a button for selecting an image file to be used as the slot image, and displays a file selection dialog, which is normally installed in the OS of the registration terminal 12, in accordance with operation, for example. An image based on the image file selected in accordance with operation on the button 6321 is displayed in the image display region 6320.

The button 6322 is a button for uploading, to the link service server 20a, the image file selected by the button 6321. The link service server 20b stores the slot image file transmitted from the registration terminal 12 in association with the URL that is displayed in the URL display region 6010 in the game URL display region 601, for example. Further, the slot image displayed in the item of "slot image" in the table 6200 in the hit setting region 620 is updated in accordance with operation on the button 6322.

The slot image upload regions 632b and 632c have the same configuration as that of the slot image upload region 632a as described above, and therefore, explanation thereof will be omitted. Further, in FIG. 17A and FIG. 17B, the slot image upload regions 632a, 632b, and 632c correspond to the second to the fourth rows of the table 6200 in the hit setting region 620, respectively.

FIG. 18 illustrates an example of the report screen 600c that is displayed when the tab 62c is specified in the menu region 60 according to the embodiment. The report screen 600c is a screen for displaying aggregation information indicating aggregation of results or processes of the slot game managed by the slot game management screen 6. The report screen 600c includes an aggregation period specification region 641, a basic information region 642, a slot image information region 643, and a download region 644.

The aggregation period specification region 641 includes an aggregation period display region 6410, an aggregation period input region 6411, and a button 6412. The aggregation period input region 6411 is a region for inputting a period in which information on the slot game is aggregated. The button 6412 is a button for applying the aggregation period input in the aggregation period input region 6411. The registration terminal 12 transmits the aggregation period input in the aggregation period input region 6411 to the link service server 20b in accordance with operation on the button 6412, and requests aggregation information on the slot game managed by the slot game management screen 6 in the aggregation period. The link service server 20b causes the link service providing unit 200b to acquire and aggregate corresponding logs, and transmits the aggregated aggregation information to the registration terminal 12.

In the basic information region 642, the number of accesses, the number of plays, the number of unique users, the maximum number of plays for a user, and an average number of plays are displayed as basic information on the target slot game. In the slot image information region 643, a table 6430 is displayed, in which records each having items of "slot image", "number of hits", and "last date and time" are included. In the item of "slot image", each of the slot images 5110a, 5110b, 5110c, and 5110d used for the slot game is displayed in each of the records. In the item of "number of hits", the number of hits using the slot image of the record is displayed. In the item of "last date and time", a last date and time, at which the slot image of the record is hit, is displayed.

The download region 644 includes a button 6440. The button 6440 is a button for downloading logs of the slot game managed by the slot game management screen 6 in the period specified by the aggregation period specification region 641. The registration terminal 12 transmits the aggregation period input in the aggregation period input region 6411 in accordance with operation on the button 6440, and requests the link service server 20b to provide logs in the aggregation period. The link service server 20b causes the link service providing unit 200b to acquire log information on the corresponding logs in the specified aggregation period, stores the log information in a file of a comma-separated values (CSV) format for example, and transmits the file to the registration terminal 12.

Next, with reference to FIG. 19, FIGS. 20A and 20B, and FIG. 22, an example of a stamp rally management screen for managing the stamp rally service described with reference to FIGS. 4A and 4B will be described. In this example, similarly to the slot game management screen as described above, it is assumed that the stamp rally management screen is provided on the registration terminal 12 by the link service server 20b that provides the second link service 2b that is compatible with the fashion of adding the identification information uid to the link information. That is, each of the screens illustrated in FIG. 19, FIG. 20A, FIG. 20B, and FIG. 22 is displayed on the registration terminal 12 by the link service setting unit 126 that has been loaded from the link service server 20b onto the browser unit 120 of the registration terminal 12.

For example, the third provider logs into the link service server 20b through the registration terminal 12 using the account information #2 that is sent from the first provider at Step S20 in FIG. 6. The link service server 20b performs an authentication process based on the account information #1 used for the login for example, and if authentication is successful, the link service server 20b provides the stamp rally management screen on the registration terminal 12.

FIG. 19, FIGS. 20A and 20B, and FIG. 22 illustrate examples of a main menu screen 700a, a setting screen 700b, and a report screen 700c in a stamp rally management screen 7 applicable to the embodiment, respectively. The stamp rally management screen 7 includes a menu region 70 in common in all of the screens as illustrated in FIG. 19, FIGS. 20A and 20B, and FIG. 22. The menu region 70 has the same configuration as that of the menu region 60 as described above, and includes a title 71 of the screen, tabs 72a, 72b, and 72c, and a logout button 73 for logging out of the stamp rally management screen 7. The tabs 72a, 72b, and 72c switch display of the stamp rally management screen 7 to the main menu screen 700a, the setting screen 700b, and the report screen 700c, respectively, in accordance with operation.

In FIG. 19, FIGS. 20A and 20B, and FIG. 22, the same components as those illustrated in FIG. 4A and FIG. 4B as described above are denoted by the same reference signs, and detailed explanation thereof will be omitted.

Figure 19:
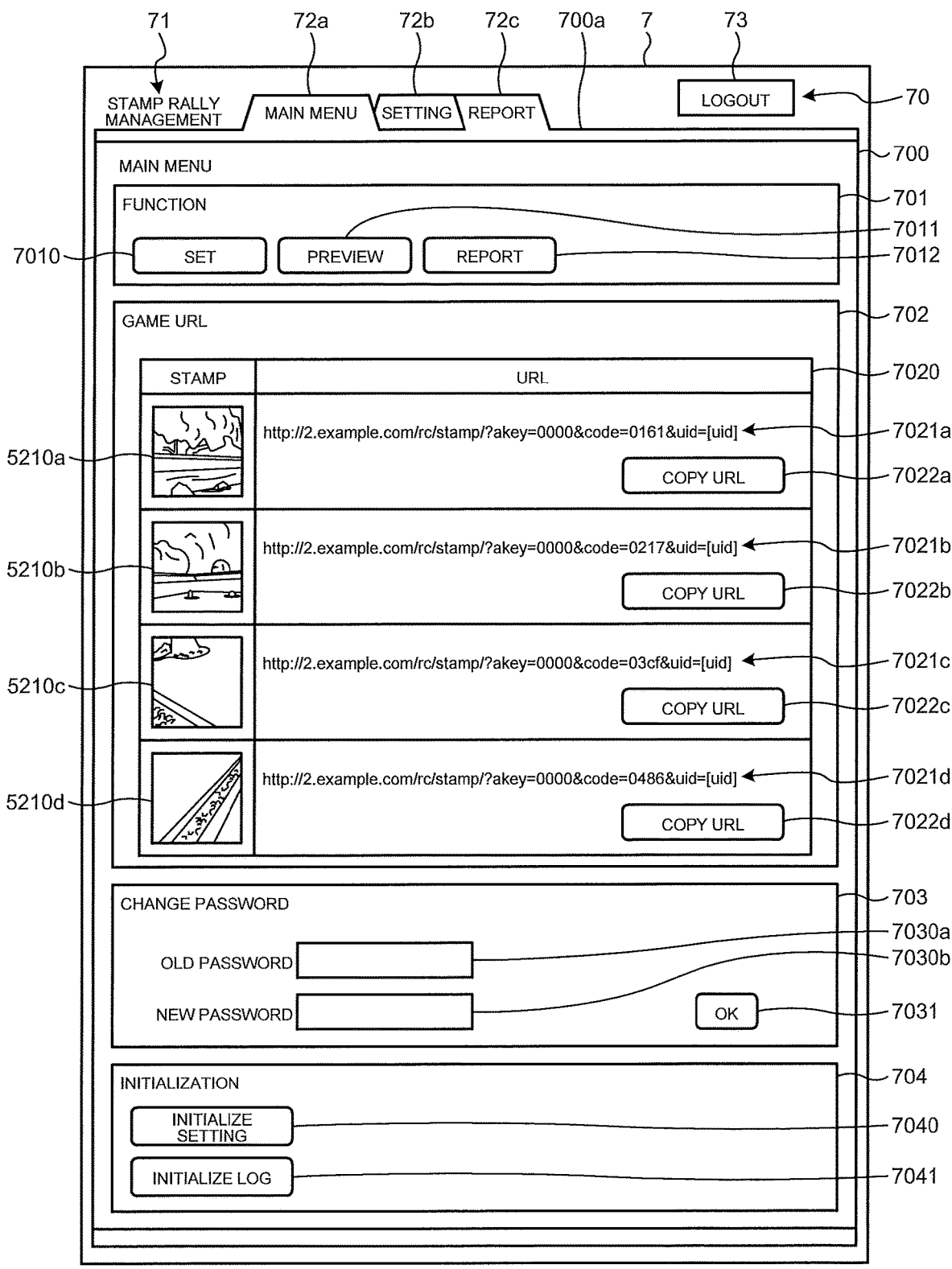
FIG. 19 is a diagram for explaining an example of a stamp rally management screen applicable to the embodiment.

FIG. 19 illustrates an example of the main menu screen 700a that is displayed when the tab 72a is specified in the menu region 70. In the example in FIG. 19, the main menu screen 700a includes a function setting region 701, a game URL display region 702, a login management region 703, and an initialization region 704.

The function setting region 701 includes buttons 7010, 7011, and 7012. The buttons 7010 and 7012 are buttons for switching display to the setting screen 700b and the report screen 700c, respectively, and implement the same functions as those of the tabs 72b and 72c in the menu region 70. The button 7011 is a button for displaying a preview of the stamp rally screen 520 illustrated in FIG. 4A.

The game URL display region 702 includes a display region 7020 for displaying each of the stamp images used in a stamp rally managed by the stamp rally management screen 7 and a URL in association with each other. In this example, in the stamp rally managed by the stamp rally management screen 7, four stamp images 5210a, 5210b, 5210c, and 5210d are used. The stamp images 5210a, 5210b, 5210c, and 5210d are managed in association with URLs 7021a, 7021b, 7021c, and 7021d, respectively. Each of the URLs 7021a, 7021b, 7021c, and 7021d is generated and stored by the ID link information generating unit 213 in advance, for example.

In this example, a URL (for example, the URL 7021a) of a stamp image (for example, the stamp image 5210a) includes, in advance, parameters of "akey=0000" and "code=0161" and the identification information adding portion "uid=[uid]" with respect to a single URL of "http://2.example.com/rc/stamp/" that is generated for the account information #1, for example.

The parameter of "akey=0000" is referred to as an access key, and used to identify an event. The parameter of "code=0161" is a code, and is identification information used in an event that is identified by the access key. The code is associated with each of the regions 521a to 521d in the stamp rally screen 520 in advance, for example. Specifically, by setting the access key to different values for a single piece of account information #1, it becomes possible to provide a plurality of stamp rally services. Further, by setting the code to different values for a single access key, it becomes possible to distinguish a plurality of stamp images used in the single stamp rally service. Furthermore, by adding the identification information adding portion, it becomes possible to associate each of the stamp images with the identification information uid.

In the game URL display region 702, buttons 7022a, 7022b, 7022c, and 7022d are provided in accordance with display of the URLs 7021a, 7021b, 7021c, and 7021d, respectively. The buttons 7022a, 7022b, 7022c, and 7022d are buttons for copying the corresponding URLs 7021a, 7021b, 7021c, and 7021d as text in accordance with operation. For example, the copied URL can be used as link information to be registered in the user environment identification service server 10 to be described later.

The login management region 703 is a region for managing login of a user who has logged in the stamp rally management screen 7 using the account information. In the example in FIG. 19, the login management region 703 includes input regions 7030a and 7030b for inputting an old password and a new password for changing a password, and a button 7031 for applying the new password.

The initialization region 704 includes buttons 7040 and 7041. The button 7040 is a button for initializing setting of the stamp rally service managed by the stamp rally management screen 7. The button 7041 is a button for initializing a log related to the stamp rally service.

Figure 20A:
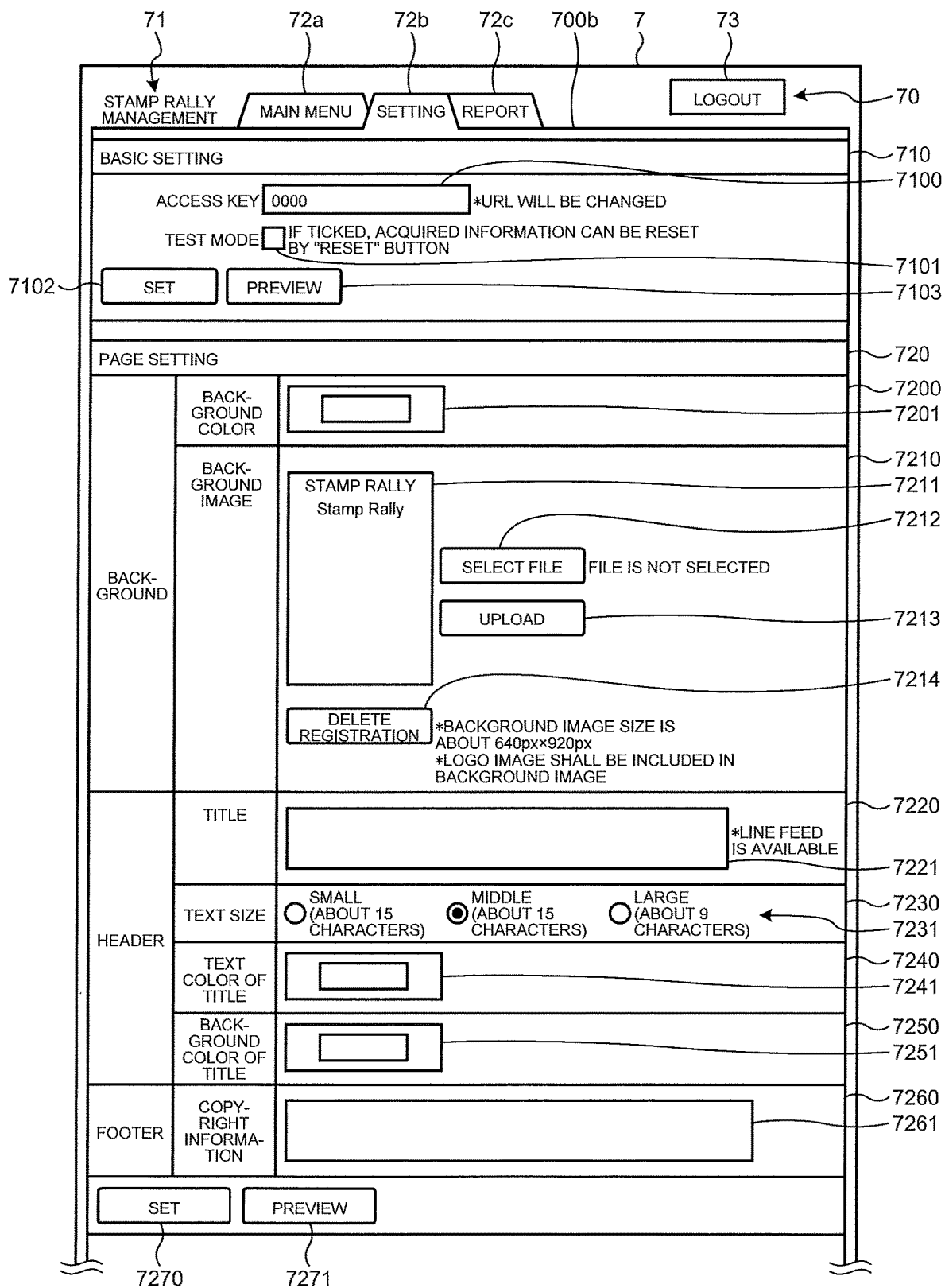
FIG. 20A is a diagram for explaining an example of the stamp rally management screen applicable to the embodiment.

FIG. 20A and FIG. 20B illustrate an example of the setting screen 700b that is displayed when the tab 72b is specified in the menu region 70. In this example, an upper portion of a setting screen 800b including the menu region 70 is illustrated in FIG. 20A, and a portion continuing to a bottom edge is illustrated in FIG. 20A for the sake of explanation.

The upper portion of the setting screen 700b illustrated in FIG. 20A includes a basic setting region 710 and a page setting region 720. The portion continuing to the bottom end of the setting screen 700b illustrated in FIG. 20B includes a stamp behavior setting region 730, a stamp image setting region 740, and an initialization region 750.

In FIG. 20A, the basic setting region 710 includes an input region 7100, a check box 7101, and buttons 7102 and 7103. The input region 7100 is an input region for inputting an access key. In the input region 7100, the access key included in each of the URLs 7021a, 7021b, 7021c, and 7021d displayed in the display region 7020 is displayed by default. In the input region 7100, when an access key with a value different from a default value is input, the value of the access key in each of the URLs 7021a, 7021b, 7021c, and 7021d displayed in the display region 7020 is updated with the input value, and each of the URLs 7021a, 7021b, 7021c, and 7021d is changed.

The check box 7101 changes an operation mode of the stamp rally service managed by the stamp rally management screen 7 to a test mode when a check is input. The button 7102 is a button for setting contents input in the input region 7100 and the check box 7101. The registration terminal 12 transmits the setting contents input in the basic setting region 710 to the link service server 20b in accordance with operation on the button 7102. The link service server 20b updates each of the URLs 7021a, 7021b, 7021c, and 7021d stored in the ID link information generating unit 213 in accordance with the setting transmitted from the registration terminal 12, for example.

The button 7103 is a button for displaying a preview of the stamp rally screen 520.

In FIG. 20A, the page setting region 720 includes setting regions 7200 and 7210 for setting a background image of the stamp rally screen 520 illustrated in FIG. 4A for the stamp rally service managed by the stamp rally management screen 7, setting regions 7220 to 7250 for setting a header portion, a setting region 7260 for setting a footer portion, and buttons 7270 and 7271.

The setting region 7200 includes an input region 7201 for specifying a background color of the stamp rally screen 520. In the input region 7201, for example, a color palette is displayed in accordance with operation, and a user can set the background color of the stamp rally screen 520 by specifying a desired color in the color palette.

The setting region 7210 is a region for setting a background image of the stamp rally screen 520, and includes an image display region 7211 and buttons 7212, 7213, and 7214. The button 7212 is a button for selecting an image file used as a background image, and displays a file selection dialog, which is normally installed in the OS of the registration terminal 12, in accordance with operation, for example. An image based on the image file selected in accordance with operation the button 7212 is displayed in the image display region 7211.

The button 7213 is a button for uploading, to the link service server 20b, the image file selected by the button 7212 as a background image file. The registration terminal 12 transmits the image file that is selected by operation on the button 7212 to the link service server 20b in accordance with operation on the button 7213. The link service server 20b stores the background image file transmitted from the registration terminal 12 in association with information, in which an access key of "akey=0000" is added to a URL of "http://2.example.com/rc/stamp/" of each of the URLs 7021a, 7021b, 7021c, and 7021d corresponding to the account information #1 displayed in the game URL display region 702 for example, and registers the background image file.

The button 7214 is a button for deleting a registered background image file. It is possible to include an image, such as a logo, in the background image. While details will be described later, it is possible to compose a design including a logo image by controlling a layout of the stamp images 5210a to 5210d in the stamp rally screen 520.

In the setting regions 7220 to 7250 for setting the header portion, the setting region 7220 includes an input region 7221 for inputting text of a title displayed in the slot screen 510. The setting regions 7230 to 7250 include input regions 7231, 7241, and 7251 for inputting a text size, a text color, and a background color of the title displayed in the stamp rally screen 520. In the input regions 7241 and 7251, color palettes are displayed in accordance with operation, and it is possible to specify desired colors in the color palettes. A setting region 7261 for setting the footer portion is a region for inputting copyright information on the stamp rally screen 520.

The button 7270 is a button for setting contents input in the setting regions 7200 to 7260. The registration terminal 12 transmits the setting contents input in the page setting region 720 to the link service server 20b in accordance with operation on the button 7270. The link service server 20b updates information on the stamp rally service managed by the stamp rally management screen 7 in accordance with the setting transmitted from the registration terminal 12.

The button 7271 is a button for displaying a preview of the stamp rally screen 520 in which the contents input in the setting regions 7200 to 7260 are reflected.

In FIG. 20B, the stamp behavior setting region 730 includes setting regions 7310 to 7350 and buttons 7360 and 7361. The setting region 7310 includes an input region 7311 for specifying a layout of the stamp images. In this example, it is possible to select a layout of the stamp images from among a layout in which four stamp images are arranged in a 2×2 matrix, a layout in which nine stamp images are arranged in a 3×3 matrix, and a layout in which 16 stamp images are arranged in a 4×4 matrix.

The setting region 7320 includes input regions 7321 and 7322 for setting a display size of the stamp image. In this example, the display size is specified by a ratio (%) of each of the regions 521a, 521b, 521c, and 521d (see FIG. 4A), which are determined to display the stamp images, to the area of each of the regions. The input region 7321 is for directly inputting the ratio as a value, and the input region 7322 is for inputting the ratio by a slider.

The setting regions 7330 to 7350 include input regions 7331, 7341, 7351, and 7352 for setting behaviors in accordance with operation on the buttons 522 and 523 in the stamp rally screen 520. The input region 7331 is a region for inputting a threshold for the number of unique stamp images to be acquired as a condition to complete the stamp rally in the stamp rally screen 520. When a value of "0" is input in the input region 7331, the number of stamp images included in the layout specified in the input region 7311 as described above is used as the threshold.

The input region 7341 is a region for inputting text to be displayed on the button 523 when the button 523 illustrated in FIG. 4B is displayed instead of the button 522 illustrated in FIG. 4A because the condition for the stamp rally in the stamp rally screen 520 is achieved. The input region 7351 is a region for inputting link information (URL) to be linked when the button 523 is operated. In the input region 7351, it is preferable that the identification information adding portion is automatically added. The button 7352 is a button for selecting link information to be input to the input region 7351, from among link destinations that are prepared in advance by the second link service 2b, for example.

The button 7360 is a button for setting contents input in the setting regions 7310 to 7350. The registration terminal 12 transmits the setting contents input in the setting regions 7310 to 7350 to the link service server 20b in accordance with operation on the button 7360. The link service server 20a updates information on the stamp rally service managed by the stamp rally management screen 7 in accordance with the setting transmitted from the registration terminal 12.

The button 7361 is a button for displaying a preview of the stamp rally screen 520.

In FIG. 20B, the stamp image setting region 740 includes a setting region 7400 for setting an ON image and an OFF image, which are to be displayed in each of the regions 521a to 521d (in a case where four regions are specified in the input region 7311) in the stamp rally screen 520, in association with a code. The ON image is each of the stamp images 5210a to 5210d to be displayed in each of the regions 521a to 521d when the condition is achieved. The OFF image is an image to be displayed in each of the regions 521a to 521d when the condition is not achieved. If nothing is specified as the OFF image, a default image, a background color, or a background image is displayed in the corresponding region.

As for the case where "the condition is achieved", for example, when the first link service 2a (the link service server 20a) receives, as the link information, any of the URLs 7021a, 7021b, 7021c, and 7021d displayed in the display region 7020 of the game URL display region 702, it is determined that the condition is achieved in the region corresponding to the received URL. For example, when the URL 7021a is received as the link information, it is determined that the condition is achieved in the region 521a corresponding to the code.

As one example, regarding a row with a code of "0161", a button 7410a is a button for selecting an image file of an image to be used as the ON image, and displays, for example, a file selection dialog that is normally installed in the OS of the registration terminal 12. An image (the stamp image 5210a in this example) based on the image file that is selected in accordance with operation on the button 7410a is displayed in a display region on the left side.

An icon 7410b is a button for uploading, to the link service server 20b, the image file selected by the button 7410a as the image file of the ON image. The registration terminal 12 transmits the image file that has been selected in accordance with operation on the button 7410a to the link service server 20b in accordance with operation on the icon 7410b. The link service server 20b stores the image file of the ON image transmitted from the registration terminal 12 in association with a URL that includes a corresponding code among the URLs 7021a, 7021b, 7021c, and 7021d displayed in the display region 7020.

The same applies to the OFF image. A button 7412a is a button for selecting an image file of an image to be used as the OFF image, and displays, for example, a file selection dialog that is normally installed in the OS of the registration terminal 12. An image (not selected in this example) based on the image file that is selected in accordance with operation on the button 7412a is displayed in a display region 7411 on the left side.

In the region 7400, buttons 7413 provided on right ends of the respective rows are buttons for cancelling use of the stamp images (including the ON image and the OFF image) set in the corresponding rows. The stamp image corresponding to the row in which the button 7413 is specified is not handled as a stamp, and the number of stamps is reduced. In this example, regarding the first row, use of the stamp image 5210a specified as the ON image is cancelled and disabled in accordance with operation on the corresponding button 7413. When a corresponding OFF image is specified, use of the OFF image is also cancelled. Therefore, the corresponding region 521a in the stamp rally screen 520 remains blank. Further, the number of stamps that are required to achieve the condition is reduced from four to three.

Figure 21A:
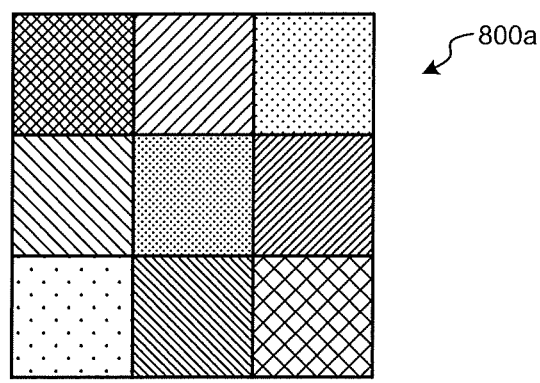
FIGS. 21A and 21B are diagrams for explaining display in a case where use of stamp images is cancelled, which is applicable to the embodiment.
Figure 21B:
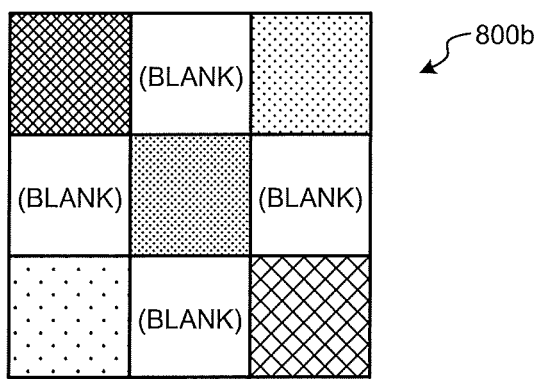

FIG. 21A illustrates an example of the layout in which nine stamp images are arranged in a 3×3 matrix. In the drawing, lines are applied in frames representing regions, and indicate that stamp images are displayed. In the state as illustrated in FIG. 21A, if use of four stamp images is cancelled in an alternating manner for example, the regions in which the use is cancelled become blank as illustrated in FIG. 21B. In the blank regions, a background color or a background image is displayed. Therefore, for example, by generating the background image by taking into account the blank regions, it becomes possible to configure the stamp rally screen 520 with a variety of designs.

In FIG. 20B, buttons 7420 and 7421 are provided at the bottom end of the stamp image setting region 740.

The button 7420 is a button for setting contents input in the setting region 7400 of the stamp image setting region 740. The registration terminal 12 transmits the setting contents and the stamp image files input in the setting region 7400 to the link service server 20b in accordance with operation on the button 7420. The link service server 20b updates information on the stamp rally service managed by the stamp rally management screen 7 in accordance with the setting and the stamp image files transmitted from the registration terminal 12.

The button 7271 is a button for displaying a preview of the stamp rally screen 520 in which the contents input in the setting region 7400 are reflected.

Figure 22:
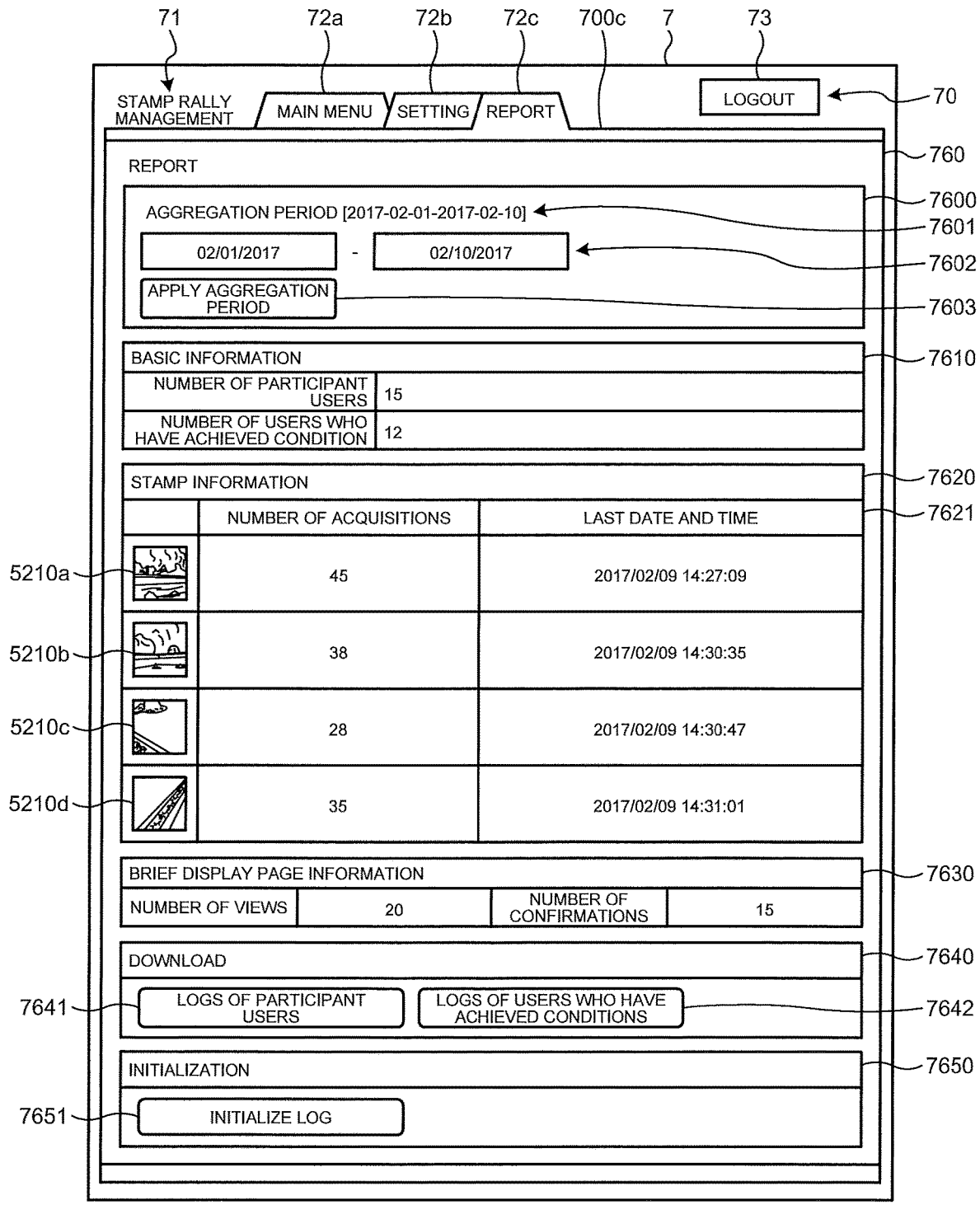
FIG. 22 is a diagram for explaining an example of the stamp rally management screen applicable to the embodiment.

FIG. 22 illustrates an example of the report screen 700c that is displayed when the tab 72c is specified in the menu region 70 according to the embodiment. The report screen 700c is a screen for displaying aggregation information that is obtained by aggregating results or processes of the stamp rally service managed by the stamp rally management screen 7. The report screen 700c includes, in a report display region 760, an aggregation period specification region 7600, a basic information region 7610, a stamp information region 7620, a brief display page information region 7630, a download region 7640, and an initialization region 7650.

The aggregation period specification region 7600 includes an aggregation period display region 7601, an aggregation period input region 7602, and a button 7603. The aggregation period input region 7601 is a region for inputting a period in which information on the stamp rally service is aggregated. The button 7603 is a button for applying the aggregation period input in the aggregation period input region 7601. The registration terminal 12 transmits the aggregation period input in the aggregation period input region 7602 to the link service server 20b in accordance with operation on the button 7603, and requests aggregation information on the stamp rally service managed by the stamp rally management screen 7 in the aggregation period. The link service server 20b acquires and aggregates corresponding logs from the link service providing unit 200b, and transmits aggregation information obtained by the aggregation to the registration terminal 12.

In the basic information region 7610, the number of participant users and the number of users who have achieved a condition, as basic information on a corresponding stamp rally service. In the stamp information region 7620, the number of acquisitions and the last acquisition date and time are displayed for each of the stamp images 5210a to 5210d set in the stamp rally screen 520.

In the brief display page information region 7630, when brief setting is specified in accordance with operation on the button 7352 in the setting region 7350 of the stamp behavior setting region 730 as described above for example, the number of views and the number of confirmations of a page specified by the brief setting are displayed.

The download region 7640 includes buttons 7641 and 7642. The button 7641 is a button for downloading logs for users who have participated in the stamp rally service managed by the stamp rally management screen 7 in the period specified by the aggregation period specification region 7600. The button 7642 is a button for downloading logs for users who have achieved conditions among the users who have participated in the stamp rally service in the period specified by the aggregation period specification region 7600.

The registration terminal 12 transmits the aggregation period input in the aggregation period specification region 7600 and a user type to be a target for downloading, in accordance with operation on the buttons 7641 and 7642, and requests the link service server 20b to provide logs in the aggregation period. The link service server 20b causes the link service providing unit 200b to acquire log information on the corresponding logs in the specified aggregation period, stores the log information in a file of a CSV format for example, and transmits the file to the registration terminal 12.

The initialization region 7650 includes a button 7651. The button 7651 is a button for initializing logs of the stamp rally service managed by the stamp rally management screen 7.

Next, with reference to FIG. 23 and FIG. 24, examples of a registration screen for registering the environmental information and the link information in the user environment identification service server 10 by the third provider will be described. Each of the screens illustrated in FIG. 23 and FIG. 24 is displayed on the registration terminal 12 by the environment identification information setting unit 124 that has been loaded from the user environment identification service server 10 onto the browser unit 120 of the registration terminal 12.

Figure 23:
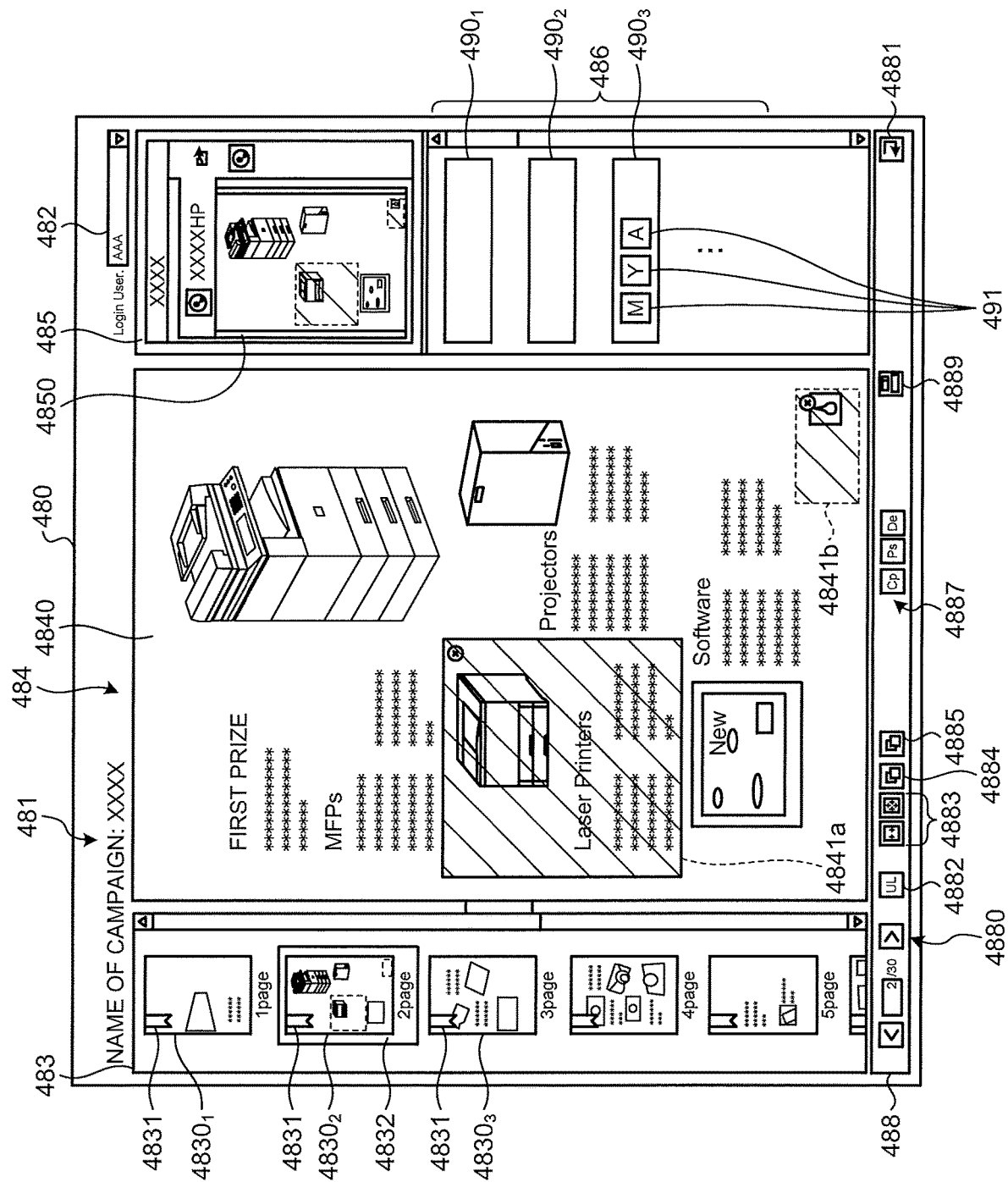
FIG. 23 is a diagram illustrating an example of a registration screen according to the embodiment.
Figure 24:
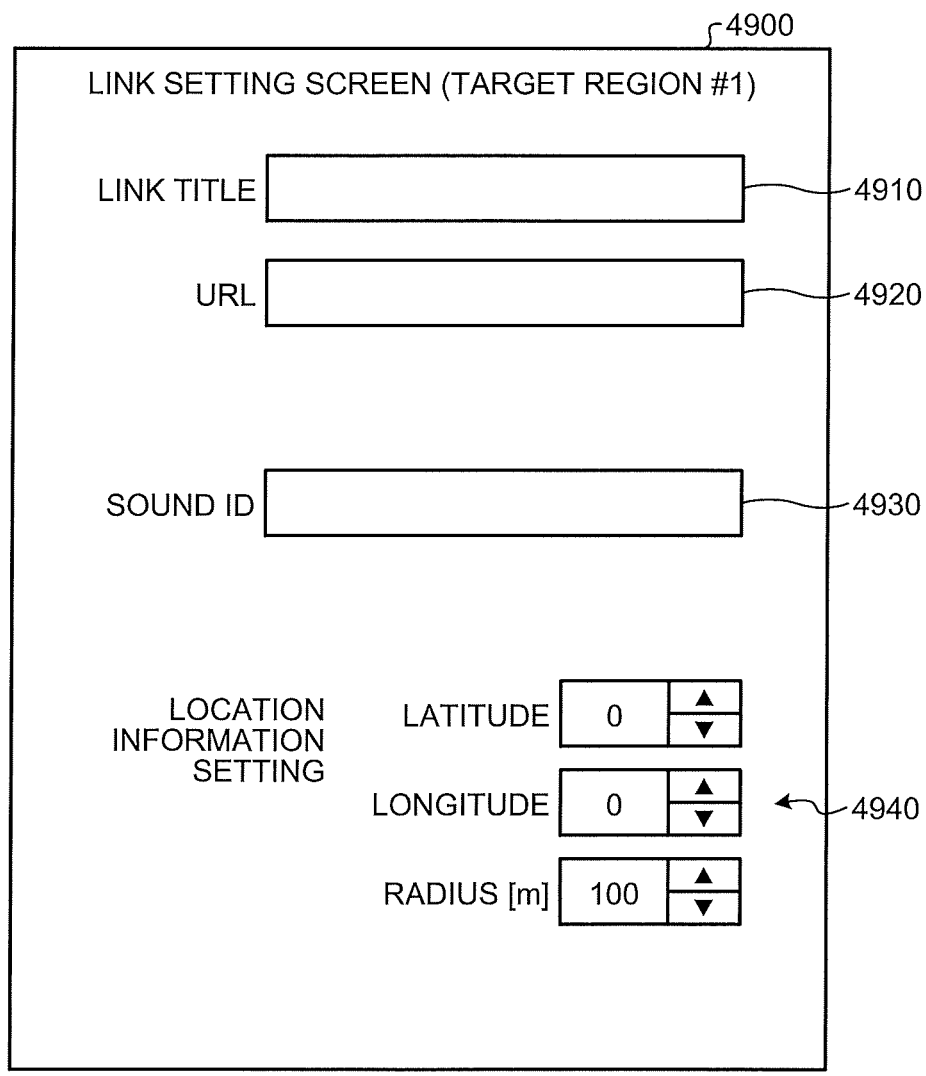
FIG. 24 is a diagram illustrating an example of a link information setting screen in a case where a button is specified according to the embodiment.

FIG. 23 illustrates an example of the registration screen according to the embodiment. In FIG. 23, a registration screen 480 includes a header region 481, a thumbnail display region 483, a page editing region 484, a preview region 485, an environmental information region listing region 486, and a tool bar 488. In the registration screen 480, it is possible to register an image as environmental information on a user, and register other kinds of environmental information (the sound 51, the location information 52, or the like) in association with the image.

In the header region 481, a name of a campaign to be registered in the registration screen 480 is displayed on the left end, and a user menu display portion 482 for displaying a menu that is available with the authority of a user who has logged in the registration terminal 12 is arranged on the right end. In this example, the campaign includes a series of processes performed by the third provider to provide contents to a user using the content providing service 3.

In the thumbnail display region 483, thumbnail images $4830_1$, $4830_2$, $4830_3$, . . . , that are obtained by reducing corresponding images related to the campaign are displayed. The third provider registers the images related to the campaign in the environment identification information setting unit 124 in advance.

In the page editing region 484, an image 4840 to be edited among the images included in the campaign is displayed. For example, the environment identification information setting unit 124 displays an original image of a certain thumbnail image that is selected from among the thumbnail images $4830_1$, $4830_2$, $4830_3$, . . . displayed on the thumbnail display region 483, as the image 4840 on the page editing region 484. In the example in FIG. 23, the thumbnail image $4830_2$ is selected in the thumbnail display region 483, and an original image of the selected thumbnail image $4830_2$ is displayed as the image 4840 on the page editing region 484. Further, in the thumbnail display region 483, the thumbnail image $4830_2$ that is selected and currently displayed in the page editing region 484 is displayed in a highlighted manner using a surrounding frame 4832.

When a certain area is specified in the image 4840 displayed in the page editing region 484, the environment identification information setting unit 124 can set the specified area as an environmental information region. The area is specified when the environment identification information setting unit 124 accepts, via the input accepting unit 123, operation that a user has performed on the input device 1207. For example, by specifying arbitrary two points in the image 4840 displayed in the page editing region 484, a rectangular area with the specified two points serving as vertices of a diagonal is specified. In the example in FIG. 23, environmental information regions 4841a and 4841b are set by rectangular areas in the image 4840 in the page editing region 484.

The environment identification information setting unit 124 can explicitly indicate the environmental information regions 4841a and 4841b by displaying the set environmental information regions 4841a and 4841b in a certain color that is different from a color of the outside region, for example. The shape of the environmental information region is not limited to a rectangle, and arbitrary enclosed shapes may be adopted.

The environment identification information setting unit 124 generates identification information (a serial number or the like) for identifying each of the set environmental information regions 4841a and 4841b, and associates the identification information with each of the set the environmental information regions 4841a and 4841b. The identification information is generated so as to be able to identify the environmental information region through each of the images included in the campaign to be edited.

The environment identification information setting unit 124 can associate one or more pieces of link information with the environmental information regions 4841a and 4841b set in the page editing region 484, which will be described in detail later.

Further, the environment identification information setting unit 124 adds a marker image 4831 to a thumbnail image corresponding to an image, for which some editing, such as specification of an environmental information region, is performed in the page editing region 484 and which is not yet stored, among the thumbnail images $4830_1$, $4830_2$, $4830_3$, . . . displayed in the thumbnail display region 483.

The preview region 485 displays a preview screen 4850 obtained by emulating a screen that is for displaying the image being edited in the page editing region 484 on the display device 1204 of the retrieval terminal 20 using an application program corresponding to the information processing system 1000. The environment identification information setting unit 124 explicitly displays, in the preview region 485, each of the environmental information regions 4841a and 4841b set in the page editing region 484, in a highlighted manner or the like. Further, the environment identification information setting unit 124 displays, in the preview region 485, information indicating link information set in each of the environmental information regions 4841a and 4841b, in association with each of the environmental information regions 4841a and 4841b.

In the environmental information region listing region 486, a list of pieces of link information that are added to environmental information regions set in the respective images included in the campaign to be edited are displayed using buttons $490_1$, $490_2$, $490_3$, . . . that indicate the respective regions. Further, the environmental information region can include a plurality of pieces of link information. In this case, the pieces of link information are indicated by, for example, icons 491, 491, . . . included in the button $490_3$. By specifying the buttons $490_1$, $490_2$, . . . , a link information setting screen to be described later is displayed.

In the tool bar 488, a page specifying portion 4880 for specifying a page (image) to be displayed in the page editing region 484, and buttons and button groups 4881 to 4885, 4887, and 4889 for implementing various functions included in the environment identification information setting unit 124 are arranged.

The button 4882 is a button for uploading an image from the registration terminal 12 to the user environment identification service server 10. When the button 4882 is operated, the environment identification information setting unit 124 displays a file selection dialog that is normally installed in the OS of the registration terminal 12. For example, by selecting a desired file in the file selection dialog and operating an "open" button provided in the file selection dialog, information indicating the selected file is sent to the environment identification information setting unit 124. The environment identification information setting unit 124 transmits the file indicated by the file information sent from the OS, to the user environment identification service server 10 from the registration terminal 12, and uploads an image to the user environment identification service server 10.

The button group 4883 includes two buttons for adjusting a display size of the image 4840 displayed in the page editing region 484.

The button 4884 switches a region setting mode, which is for setting a region in the page editing region 484, to an environmental information region setting mode, which is for setting an environmental information region. When the button 4884 is operated and an edit mode is switched to the environmental information region setting mode, and if a certain region is specified on the image 4840 displayed in the page editing region 484, the environment identification information setting unit 124 sets the specified region as the environmental information region.

The button 4885 switches the region setting mode, which is for specifying a region in the page editing region 484, to a mask setting mode, which is for specifying a mask region in which feature information is not to be extracted by the analyzing unit 12. When the button 4885 is operated and the edit mode is switched to the mask setting mode, and if a certain region is specified on the image 4840 displayed in the page editing region 484, the environment identification information setting unit 124 sets the specified region as the mask region.

The button group 4887 includes three buttons for copying, pasting, and deleting information. The button 4889 gives an instruction to store a campaign that is being edited in the edit screen 480. The button 4881 is a button for returning to a previous screen from the edit screen 480.

FIG. 24 illustrates an example of the link information setting screen that is displayed on the environment identification information setting unit 124 when the buttons 490₁, 490₂, . . . as described above are specified in the embodiment. In FIG. 24, a link information setting screen 4900 (illustrates as a link setting screen in the drawing) includes input regions 4910, 4920, 4930, and 4940.

The input region 4910 is a region for inputting a title of link information to be set in the link information setting screen 4900. The input region 4920 is a region for inputting a URL as the link information. For example, when it is desired to cause the user terminal (terminal device) 40 to access the first link service 2a that provides the slot game service as illustrated in FIG. 3A and FIG. 3B based on the environmental information, the third provider inputs, as the link information, a URL acquired in the URL display region 6010 as illustrated in FIG. 16, in the input region 4920.

For another example, when it is desired to cause the user terminal (terminal device) 40 to access the first link service 2a that provides the stamp rally service as illustrated in FIG. 4A and FIG. 4B based on the environmental information, the third provider inputs, as the link information, a URL corresponding to the environmental information among the URLs 7021a, 7021b, 7021c, and 7021d included in the display region 7020 of the game URL display region 702, in the input region 4920.

The input region 4930 is a region for inputting a sound ID that identifies the sound 51 serving as the environmental information. The input region 4940 is a region for inputting the location information 52 serving as the environmental information. In the input region 4940, it is possible to input the latitude and the longitude for a location, and input a radius from the location specified by the latitude and the longitude.

Other Embodiments

While the questionnaire collection service has been described above with reference to FIG. 2, it is possible to perform push-type category distribution using questionnaire replies that are acquired by the questionnaire collection service in association with the identification information uid. For example, the questionnaire replies are classified based on the contents of the replies, and the identification information uid on the user terminal 40 that has transmitted a questionnaire reply that meets a predetermined condition is specified. It may be possible to transmit a notice to the user terminal 40 identified by the identification information uid at a proper timing by using an existing push-type distribution service.

According to an embodiment of the present invention, it is possible to more flexibly set links between different systems.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system, comprising:
    a user environment identification device configured to receive, from a terminal device used by a user, terminal identification information of the terminal device in association with particular environmental information indicating at least one of a particular image and a particular sound, the particular environmental information indicating a current physical environment or a current physical location of the terminal device used by the user;
    a memory storing environmental information, including at least one of an image and a sound, in association with link information, corresponding to each piece of the environmental information, for making a link with a service provided by a service providing system;
    first circuitry configured to
        distribute account information for permitting setting for the service of the service providing system, to a content providing system configured to provide a content in linkage with the service providing system in accordance with the link information,
        distribute, to the content providing system, a search module, which is sent to the terminal device by the content providing system to cause the terminal device to perform a process of transmitting a search request to request a search for particular link information, the search request including the terminal identification information and at least one of the particular image and the particular sound as the particular environmental information of the terminal device, which is identified by the terminal identification information, to the user environment identification device, and transmit, to the terminal device identified by the terminal identification information associated with the search request, the particular link information that is retrieved from the memory based on the particular environmental information of the terminal device, including at least one of the particular image and the particular sound, included in the search request that is transmitted from the terminal device in association with the terminal identification information by the terminal device executing the search module;

second circuitry configured to access the service providing system in accordance with the account information, perform setting for the service of the service providing system, and acquire the particular link information corresponding to the setting from the service providing system; and third circuitry configured to register, in the memory, the particular environmental information, and the particular link information that is acquired by the second circuitry from the service providing system, in association with each other.

2. The information processing system according to claim 1, further comprising a registration terminal to which a service of the second circuitry is provided by the service providing system, and to which a service of the third circuitry is provided by the first circuitry.

3. The information processing system according to claim 1, wherein
the service providing system includes a plurality of service providing systems,
the first circuitry is configured to distribute, to the content providing system, the account information on each of the plurality of service providing systems, and
the second circuitry is configured to set, to a service providing system that provides a service, as a link destination of the service, another service provided by another service providing system among the plurality of service providing systems.

4. The information processing system according to claim 1, wherein the service provided by the service providing system includes a service for collecting information in accordance with an operation performed in the terminal device.

5. The information processing system according to claim 1, wherein the service provided by the service providing system includes a service for acquiring information with a constant probability in accordance with operation performed in the terminal device.

6. The information processing system according to claim 1, wherein the service provided by the service providing system includes a service for acquiring information when the particular environmental information of the terminal device meets a predetermined condition.

7. The information processing system according to claim 1, wherein the terminal device is configured to execute the search module to thereby transmit the terminal identification information and the particular environmental information to the first circuitry in association with each other, request the service providing system to provide the service using the particular link information retrieved by the first circuitry from the memory based on the particular environmental information, and request the content providing system to provide the content in accordance with the service that is received from the service providing system based on the request.

8. The information processing system according to claim 1, wherein
the information processing system is operated by a first provider;
the content providing system is operated by a third provider;
the service providing system is operated by a second provider; and
the content providing system is configured to acquire the account information and the search module in accordance with a contract signed between the first provider and the third provider.

9. The information processing system according to claim 8, wherein the first circuitry is further configured to acquire the account information to be distributed, from the service providing system in accordance with a contract signed between the first provider and the second provider.

10. The information processing system of claim 1, further comprising the terminal device, wherein the terminal device is configured to transmit the current physical location of the terminal device to the user environment identification device.

11. An information processing method implemented by an information processing system including a user environment identification device configured to receive, from a terminal device used by a user, terminal identification information of the terminal device in association with particular environmental information indicating at least one of a particular image and a particular sound, the particular environmental information indicating a current physical environment or a current physical location of the terminal device used by the user, wherein the information processing system includes a memory storing environmental information, including at least one of an image and a sound, in association with link information, corresponding to each piece of the environmental information, for making a link with a service provided by a service providing system, the information processing method comprising:

distributing account information for permitting setting for a service of the service providing system, to a content providing system configured to provide a content in linkage with the service providing system in accordance with particular link information;

distributing, to the content providing system, a search module, which is sent to the terminal device by the content providing system to cause the terminal device to perform a process of transmitting a search request to request a search for particular link information, the search request including the terminal identification information and at least one of the particular image and the particular sound, as the particular environmental information of the terminal device, which is identified by the terminal identification information, to the user environment identification device;

transmit, to the terminal device identified by the terminal identification information associated with the search request, the particular link information that is retrieved from the memory based on the particular environmental information of the terminal device, including at least one of the particular image and the particular sound, included in the search request that is transmitted from the terminal device in association with the terminal identification information by the terminal device executing the search module;

accessing the service providing system in accordance with the account information to perform setting for the service of the service providing system, and acquire the particular link information corresponding to the setting from the service providing system; and registering, in the memory, the particular environmental information and the acquired link information from the service providing system, in association with each other.

12. A user environment identification device configured to transmit link information to a service providing device configured to provide a service, based on information included in a request from a terminal device operated by a user, the user environment identification device comprising:

a memory to store environmental information comprising at least one of an image and a sound, in association with the link information to the service provided by the service providing device corresponding to each piece of environmental information; and processing circuitry configured to based on a search request transmitted from a terminal device executing a search module received from a content providing system, the search request including terminal identification information of the terminal device and particular environmental information including at least one of a particular image and a particular sound, as environmental information, retrieve particular link information stored in the memory and corresponding to the particular environmental information comprising at least one of the particular image and the particular sound, and the particular location information included in the search request, and transmit the retrieved link information corresponding to the particular environmental information comprising any of the particular image and the particular sound, and the particular location information included in the search request.

* * * * *